United States Patent
Roger et al.

(10) Patent No.: US 12,111,392 B2
(45) Date of Patent: Oct. 8, 2024

(54) RADAR DEVICE AND METHOD FOR DETECTING RADAR TARGETS

(71) Applicant: Infineon Technologies AG, Neubiberg (DE)

(72) Inventors: Andre Roger, Munich (DE); Farhan Bin Khalid, Munich (DE); Mayeul Jeannin, Munich (DE); Markus Bichl, Feldkirchen-Westerham (DE)

(73) Assignee: Infineon Technologies AG, Neubiberg (DE)

( * ) Notice: Subject to any disclaimer, the term of this patent is extended or adjusted under 35 U.S.C. 154(b) by 461 days.

(21) Appl. No.: 17/448,609

(22) Filed: Sep. 23, 2021

(65) Prior Publication Data
US 2022/0120890 A1 Apr. 21, 2022

(30) Foreign Application Priority Data

Oct. 15, 2020 (DE) .......................... 102020127177.8

(51) Int. Cl.
  *G01S 13/89* (2006.01)
  *G01S 13/58* (2006.01)
  *G01S 13/931* (2020.01)

(52) U.S. Cl.
  CPC ............ *G01S 13/89* (2013.01); *G01S 13/584* (2013.01); *G01S 13/931* (2013.01)

(58) Field of Classification Search
  CPC ....... G01S 13/89; G01S 13/584; G01S 13/931
  See application file for complete search history.

(56) References Cited

U.S. PATENT DOCUMENTS

| | | | | |
|---|---|---|---|---|
| 9,726,756 | B2 * | 8/2017 | Jansen | .................... G01S 13/87 |
| 10,775,489 | B2 * | 9/2020 | Rao | ........................ G01S 13/931 |
| 11,204,647 | B2 * | 12/2021 | Rao | ........................... G01S 7/41 |

(Continued)

FOREIGN PATENT DOCUMENTS

DE 102017125156 A1 5/2019

*Primary Examiner* — Matthew M Barker
(74) *Attorney, Agent, or Firm* — Harrity & Harrity, LLP

(57) ABSTRACT

The present disclosure relates to a concept for detecting radar targets. A plurality of first receive signals is received from first antennas of an antenna array. A first combined range-Doppler map is determined by combining range-Doppler maps of each of the first antennas. First confirmable range-Doppler cells of the first combined range-Doppler map are determined which match a predetermined confirmation criterion. A plurality of second receive signals is received from second antennas of the antenna array. A second combined range-Doppler map is determined by combining range-Doppler maps of each of the second antennas. Second confirmable range-Doppler cells of the second combined range-Doppler map are determined which match the predetermined confirmation criterion. The first and second confirmable range-Doppler cells are combined to obtain a set of confirmable range-Doppler cells. Values of the first and the second combined range-Doppler maps corresponding to the set of confirmable range-Doppler cells are summed to obtain summed values of the combined confirmable range-Doppler cells. Summed values of the total confirmable range-Doppler cells exceeding a predefined selection threshold are selected for target detection.

23 Claims, 14 Drawing Sheets

(56) References Cited

U.S. PATENT DOCUMENTS

| | | | |
|---|---|---|---|
| 2009/0085800 A1* | 4/2009 | Alland | G01S 13/343 |
| | | | 342/25 R |
| 2019/0041494 A1* | 2/2019 | Roger | G01S 7/352 |
| 2019/0377062 A1* | 12/2019 | Barkan | G01S 13/536 |
| 2020/0341134 A1* | 10/2020 | Roger | G01S 7/352 |

* cited by examiner

RADAR DEVICE AND METHOD FOR DETECTING RADAR TARGETS

CROSS REFERENCE TO RELATED APPLICATION

This application claims priority to German Patent Application No. 102020127177.8, filed on Oct. 15, 2020, the contents of which are incorporated by reference herein in their entirety.

TECHNICAL FIELD

The present disclosure relates to radar systems and, more particularly, to radar concepts using signal processing techniques distributed among a plurality of integrated radar circuits.

BACKGROUND

Automotive radars, along with other environmental sensors such as lidar, ultrasound, and cameras, are one of the backbones of self-driving cars and advanced driver assistant systems (ADASs). These technological advancements are enabled by complex systems with signal processing paths from radars/sensors to one or more controllers.

SUMMARY

According to a first aspect, the present disclosure is directed to a radar device. The radar device comprises a first radar-integrated circuit (IC) configured to process first receive signals from first antennas of an antenna array. The first radar-IC is configured to determine a first combined range-Doppler map by combining range-Doppler maps of each of the first antennas of the antenna array. The first radar-IC is further configured to determine first selected range-Doppler cells of the first combined range-Doppler map matching a predetermined selection criterion. The first radar-IC is further configured to determine first confirmable range-Doppler cells of the first combined range-Doppler map matching a predetermined confirmation criterion. Here, confirmable range-Doppler cells refer to range-Doppler cells that still have to be confirmed as to whether they qualify for further processing (e.g., target detection). The radar device comprises at least a second radar-IC configured to process second receive signals from second antennas of the antenna array. The second radar-IC is configured to determine a second combined range-Doppler map by combining range-Doppler maps of each of the second antennas of the antenna array. The second radar-IC is further configured to determine second selected range-Doppler cells of the second combined range-Doppler map matching the predetermined selection criterion. The second radar-IC is further configured to determine second confirmable range-Doppler cells of the second combined range-Doppler map matching the predetermined confirmation criterion.

The first radar-IC is configured to communicate information indicating the first confirmable range-Doppler cells to the second radar-IC. The second radar-IC is configured to determine a combined set of confirmable range Doppler cells by logically combining the first confirmable range Doppler cells of the first radar-IC with the second confirmable range Doppler cells of the second radar-IC. The second radar-IC is further configured to communicate the combined set of confirmable range-Doppler cells to the first radar-IC. In response, the first radar-IC is configured to communicate values of the first combined range-Doppler map corresponding to the combined set of confirmable range-Doppler cells to the second radar-IC. The second radar-IC is then configured to perform a summation of values of the first and the second combined range-Doppler maps corresponding to the combined set of confirmable range-Doppler cells to obtain summed values of the combined set of confirmable range-Doppler cells. The second radar-IC is further configured to select summed values of the combined set of confirmable range-Doppler cells exceeding a predefined threshold as third selected range-Doppler cells and to logically combine the third selected range-Doppler cells with the first selected range-Doppler cells and the second selected range-Doppler cells to obtain collectively selected range-Doppler cells for further processing (e.g., target detection).

The radar device further comprises a data interface configured to forward information indicative of the collectively selected range-Doppler cells to a common processor for further processing, such as target object detection based on the collectively selected range-Doppler cells. In some implementations, the data interface couples the first radar-IC with the second radar-IC. Additionally or alternatively, the data interface couples the first radar-IC and/or the second radar-IC with an external processor.

For example, a radar-IC may be a stand-alone processor or a Monolithic Microwave Integrated Circuit (MMIC) with integrated processing. In some implementations, the antenna array may be a linear receive antenna array in one dimension, such as azimuth or elevation. Thus, the first antennas may be regarded as a first sub-array and the second antennas may be regarded as a second sub-array of the same linear receive antenna array.

Thus, the present disclosure may include a distributed signal processing of first and second receive signals of a common antenna array. The first receive signals are processed by the first radar IC, while the second signals are processed by the second radar IC to obtain respective range-Doppler maps. While the first and second radar ICs compute their respective 2D range-Doppler maps and the range-Doppler cells of (potential) interest independently, the spatial or angular information inherent in the receive signals of the antenna array cannot be estimated independently since information indicative of phases of both the first and the second receive signals (phase progression across the first and second antennas of the antenna array) is required. Instead of exchanging raw receive data via the data interface, the present disclosure may compute respective 2D range-Doppler maps in the first and second radar-ICs independently, to detect first and second selected range-Doppler cells as well as first and second confirmable range-Doppler cells based on coherent integration or non-coherent integration of the respective range-Doppler maps, and to then exchange information indicative of the selected and confirmable range-Doppler cells for evaluating as to whether the confirmable range-Doppler cells are confirmed for further processing or not. In this way, an amount of data that is shared over the data interface as well as latency for data exchange can be significantly reduced. The skilled person having benefit from the present disclosure will appreciate that the proposed distributed signal processing concept is not restricted to two radar-ICs but can be extended to any number.

In some implementations, the first radar-IC is configured to determine the first combined range-Doppler map by combining range-Doppler maps of each of the first antennas of the antenna array, and the second radar-IC is configured to determine the second combined range-Doppler map by combining range-Doppler maps of each of the second antennas of the antenna array. That is, the first radar-IC can be configured to determine an antenna-specific range-Doppler map for each of the first receive signals. Each of the first receive signals stems from a different antenna of the first antennas. The first radar-IC can be configured to determine the first combined range-Doppler map based on a summation or integration of the antenna-specific range-Doppler maps of the first receive signals. The second radar-IC can be configured to determine an antenna-specific range-Doppler map for each of the second receive signals. Each of the second receive signals stems from a different antenna of the second antennas. The second radar-IC can be configured to determine the second combined range-Doppler map based on a summation or integration of the antenna-specific range-Doppler maps of the second receive signals.

In some implementations, the predetermined selection criterion based on which the first/second selected range-Doppler cells are determined can comprise amplitude or energy levels associated with indices or FFT bins of the first/second combined range-Doppler maps above a predefined first threshold, which can be adaptive. Thus, the first and second selected range-Doppler cells can comprise FFT bins (or indices thereof) of the first/second combined range-Doppler map matching the predetermined selection criterion. The predetermined confirmation criterion based on which the first/second confirmable range-Doppler cells are determined may comprise amplitude or energy levels associated with indices or FFT bins of the first/second combined range-Doppler maps below the first threshold but above a (lower) second threshold.

In some implementations, the predetermined confirmation criterion may comprise a range level above a first threshold and the predetermined selection criterion may comprise a range level below the first threshold and above a second threshold.

In some implementations, the first radar-IC is configured to communicate binary information indicating the first selected range-Doppler cells (FFT bins) and the first confirmable range-Doppler cells to the second radar-IC. In this way, an amount of information exchanged between the radar-ICs can be kept low (e.g., less than a threshold amount of information exchanged between the radar-ICs).

In some implementations, the second radar-IC is configured to combine the first and second selected range-Doppler cells via a logic OR to obtain a combined set of selected range-Doppler cells and to combine the combined set of selected range-Doppler cells with the third selected range-Doppler cells via a logic OR to obtain the collectively selected range-Doppler cells as final detections. The collectively selected range-Doppler cells or final detections can then be forwarded to a remote processor unit, such as, for example, an Electronic Control Unit (ECU) of a vehicle. In some implementations, phase information associated with the collectively selected range-Doppler cells or final detections can be forwarded to the remote processor unit to determine spatial directions of the final detections, for example by using an FFT on the final detections across the antennas of the antenna array. The phase information associated with the final detections can be collected from all radar-ICs by the common processor, for example the second radar-IC, and forwarded to the remote processor unit. Here, the common processor acts as a communication master. In some implementations, the phase information associated with the final detections can be communicated to the remote processor unit from the radar-ICs in a distributed manner.

In some implementations, the common processor (for example, the second radar-IC) could also be configured to determine spatial directions of target objects based on the final detections and based on the phase information associated therewith itself. The final detections and their associated spatial directions could then be forwarded to the remote processor unit for further processing or displaying.

In some implementations, the first radar-IC can be configured to forward information (for example, binary information) indicative of its selected and confirmable range-Doppler cells to the second radar-IC via the data interface. The second radar-IC can be configured to logically combine the first and the second selected range-Doppler cells to obtain a combined set of selected range-Doppler cells as final detections. This combination can be done via logical ORing the first and the second selected range-Doppler cells or binary information thereof, for example. The second radar-IC may be further configured to determine the combined set of confirmable range Doppler cells by logically ORing the first confirmable range Doppler cells of the first radar-IC with the second confirmable range Doppler cells of the second radar-IC and to communicate the set of confirmable range-Doppler cells to the first radar-IC. In response, the first radar-IC may be configured to communicate (complex) FFT bin values of the first combined range-Doppler map corresponding to the combined set of confirmable range-Doppler cells to the second radar-IC. The second radar-IC is then configured to perform a coherent or non-coherent integration of FFT bin values of the first and the second combined range-Doppler maps corresponding to the combined set of confirmable range-Doppler cells to obtain integrated values of the combined set of confirmable range-Doppler cells. The second radar-IC is further configured to select integrated values of the combined set of confirmable range-Doppler cells exceeding a predefined threshold (e.g. the predetermined selection criterion) as further final detections and to logically combine the further final detections with the final detections based on the logically combined first and second selected range-Doppler cells. In some implementations, the first radar-IC can be configured to forward phase (progression) information associated with the final detections to the second radar-IC via the data interface. With the additional phase (progression) information, the second radar-IC or another remote processor unit can determine spatial directions of target objects based on the final detections and based on the phase (progression) information associated therewith.

In some implementations, a remote processor unit, such as an external ECU, may act as the common processor. Here, the first radar-IC can be configured to forward information (for example, binary information) indicative of its detected first subregion to the ECU directly or indirectly via the data interface. The second radar-IC can be configured to forward information (for example, binary information) indicative of its selected and confirmable range-Doppler cells to the ECU directly or indirectly via the data interface. Here, "directly" may refer to a direct interface between the first/second radar-IC and the ECU. "Indirectly" may refer to a communication via an intermediate communication master. The external ECU can be configured to combine the first and the second selected range-Doppler cells to obtain a combined set of selected range-Doppler cells as final detections. This combination can be done via logical ORing the first and the second selected range-Doppler cells or binary information thereof, for example. The external ECU may be further configured to determine the combined set of confirmable range Doppler cells by logically ORing the first confirmable range Doppler cells of the first radar-IC with the second confirmable range Doppler cells of the second radar-IC and to communicate the combined set of confirmable range-Doppler cells to the first radar-IC. In response, the respective radar-ICs may be configured to communicate (complex) FFT bin values of the respective combined range-Doppler map corresponding to the combined set of confirmable range-Doppler cells to the external ECU. The external ECU is then configured to perform a coherent or non-coherent integration of FFT bin values of the first and the second combined range-Doppler maps corresponding to the combined set of confirmable range-Doppler cells to obtain integrated values of the combined set of confirmable range-Doppler cells. The external ECU is further configured to select integrated values of the combined set of confirmable range-Doppler cells exceeding a predefined threshold (e.g. the predetermined selection criterion) as further final detections and to logically combine the further final detections with the final detections based on the logically combined first and second selected range-Doppler cells. In some implementations, the respective radar-ICs can be configured to forward phase (progression) information associated with the final detections to the external ECU via the data interface. With the additional phase (progression) information, the external ECU can determine spatial directions of target objects based on the final detections and based on the phase (progression) information associated therewith.

In some implementations, the radar device can be configured to synchronize signal processing of the first and second radar-ICs using a common synchronization signal. This common synchronization signal can be based on a timing master device, which can, for example, either be the first or the second radar-IC.

In some implementations, the data interface can be configured to forward the first and/or the second selected and confirmable range Doppler cells as data compressed by a suitable data compression scheme.

According to a further aspect, the present disclosure is directed to a method for detecting radar targets. The method includes receiving, with a first radar-IC, a plurality of first receive signals from first antennas of an antenna array; determining, in the first radar-IC, a first combined range-Doppler map by combining range-Doppler maps of each of the first antennas of the antenna array; determining, in the first radar-IC, first selected range-Doppler cells of the first combined range-Doppler map matching a predetermined selection criterion; determining, in the first radar-IC, first confirmable range-Doppler cells of the first combined range-Doppler map matching a predetermined confirmation criterion; receiving, with a second radar-IC, a plurality of second receive signals from second antennas of the antenna array; determining, in the second radar-IC, a second combined range-Doppler map by combining range-Doppler maps of each of the second antennas of the antenna array; determining, in the second radar-IC, second selected range-Doppler cells of the second combined range-Doppler map matching the predetermined selection criterion; determining, in the second radar-IC, second confirmable range-Doppler cells of the second combined range-Doppler map matching the predetermined confirmation criterion; communicating information indicating the first confirmable range-Doppler cells from the first to the second radar-IC or to another common processor; determining, in the second radar-IC or the common processor, a combined set of confirmable range Doppler cells by logically combining the first and second confirmable range Doppler cells; communicating the combined set of confirmable range-Doppler cells to the first radar-IC; communicating values of the first combined range-Doppler map corresponding to the combined set of confirmable range-Doppler cells from the first radar-IC to the second radar-IC or the common processor; performing, in the second radar-IC or the common processor, a summation of values of the first and the second combined range-Doppler maps corresponding to the combined set of confirmable range-Doppler cells to obtain summed values of the combined set of confirmable range-Doppler cells; selecting summed values of the combined set of confirmable range-Doppler cells exceeding a predefined threshold as third selected range-Doppler cells and combining the third selected range-Doppler cells with the first and the second selected range-Doppler cells to obtain collectively selected range-Doppler cells; forwarding information indicative of the collectively selected range-Doppler cells for further processing (e.g. target detection).

In some implementations, the method may further include detecting target objects based on the collectively selected range-Doppler cells.

In some implementations, the method may further include determining spatial directions of target objects based on the collectively selected range-Doppler cells and based on phases of the first and second receive signals associated with the collectively selected range-Doppler cells.

According to a further aspect, the present disclosure is directed to a method for detecting radar targets. The method includes receiving a plurality of first receive signals from first antennas of an antenna array; determining a first combined range-Doppler map by combining range-Doppler maps of each of the first antennas; determining first confirmable range-Doppler cells of the first combined range-Doppler map matching a predetermined confirmation criterion; receiving a plurality of second receive signals from second antennas of the antenna array; determining a second combined range-Doppler map by combining range-Doppler maps of each of the second antennas; determining second confirmable range-Doppler cells of the second combined range-Doppler map matching the predetermined confirmation criterion; combining the first and second confirmable range-Doppler cells to obtain a combined set of confirmable range-Doppler cells; summing values of the first and the second combined range-Doppler map corresponding to the combined set of confirmable range-Doppler cells to obtain summed values of the combined confirmable range-Doppler cells; and selecting summed values of the combined set of confirmable range-Doppler cells exceeding a predefined selection threshold as selected range-Doppler cells.

In some implementations, the method may further include detecting target objects based on the selected range-Doppler cells.

In some implementations, the predetermined selection threshold may comprise a range-Doppler cell amplitude or energy level threshold and the predetermined confirmation criterion may comprise a range-Doppler cell amplitude or energy level below the predetermined selection threshold and above a lower threshold.

In some implementations, the predetermined confirmation criterion may comprise a range level above a first threshold and the predetermined selection threshold may comprises a range level below the first threshold and above a second threshold.

In some implementations, the method may further include determining spatial directions of target objects based on the selected range-Doppler cells and based on phases of the first and second receive signals associated with the selected range-Doppler cells.

According to yet a further aspect, the present disclosure is directed to an apparatus for detecting radar targets. The apparatus comprises a first radar-IC configured to receive a plurality of first receive signals from first antennas of an antenna array; determine a first combined range-Doppler map by combining range-Doppler maps of each of the first antennas; determine first confirmable range-Doppler cells of the first combined range-Doppler map matching a predetermined confirmation criterion; a second radar-IC configured to receive a plurality of second receive signals from second antennas of the antenna array; determine a second combined range-Doppler map by combining range-Doppler maps of each of the second antennas; determine second confirmable range-Doppler cells of the second combined range-Doppler map matching the predetermined confirmation criterion; processing circuitry configured to combine the first and second confirmable range-Doppler cells to obtain a combined set of confirmable range-Doppler cells; sum values of the first and the second combined range-Doppler map corresponding to the combined set of confirmable range-Doppler cells to obtain summed values of the combined confirmable range-Doppler cells; and select summed values of the combined set of confirmable range-Doppler cells exceeding a predefined selection threshold as selected range-Doppler cells.

Implementations of the present disclosure can be used to reduce latency since no raw data has to be exchanged over the data interface. Instead, merely basic information on the selected range-Doppler map subregions may be exchanged.

BRIEF DESCRIPTION OF THE DRAWINGS

Some examples of apparatuses and/or methods will be described in the following by way of example only, and with reference to the accompanying figures, in which.

DETAILED DESCRIPTION

Figure 1:
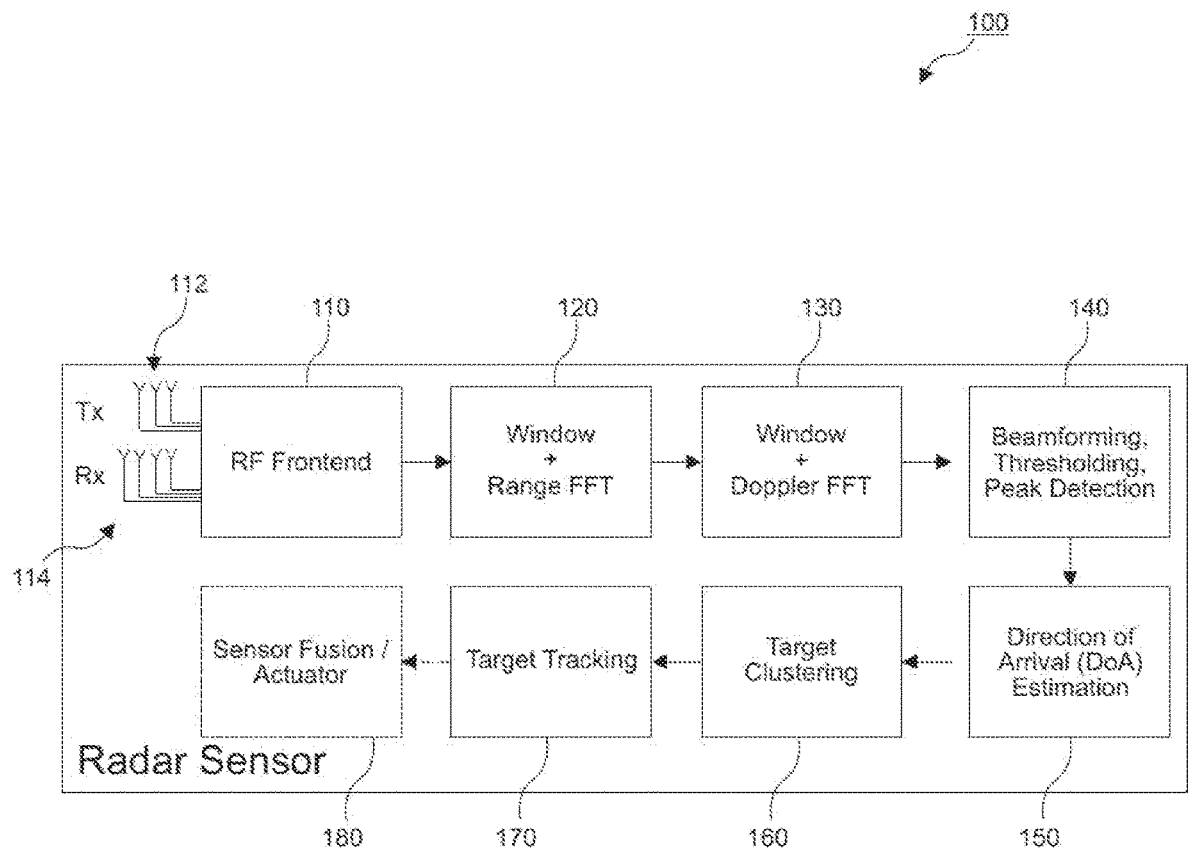
FIG. 1 shows a block diagram of a radar signal processing chain, according to implementations of the present disclosure.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, e.g. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Automotive radar systems enable the detection of objects and obstacles, their position, and speed relative to a vehicle. The development of signal processing techniques along with progress in the millimeter-wave (mm-wave) semiconductor technology plays a role in automotive radar systems. Various signal processing techniques have been developed to provide better resolution and estimation performance in all measurement dimensions: range, azimuth-elevation angles, and velocity of the targets surrounding the vehicles.

For frequency-modulated continuous-wave (FMCW) radar systems, for example, information on range, speed, and angles may be obtained by performing multiple Fast Fourier Transforms (FFTs) on samples of radar mixer outputs. A first FFT, also commonly referred to as range FFT, yields range information. A second FFT across the range transformed samples, also commonly referred to as Doppler FFT, yields speed information. The first and second FFTs yield a so-called 2D range-Doppler map comprising range and speed (FFT) bins, also referred to as range-Doppler cells. A third FFT involving phase information of signals of different antenna elements of an antenna array can yield additional spatial or angular information.

Since automated drive is continuously increasing, also requirements for angular resolution, azimuth but also elevation, are continuously increasing. This means that the number of receive channels in a radar system continuously increase. On the other side, the number of RF pins on a radar Monolithic Microwave Integrated Circuit (MMIC) is limited by the power dissipation and by the number of pins. Thus, automotive radars may combine or cascade more and more MMIC devices to handle increasing numbers of receive channels.

Some implementations described herein relate to improved signal processing concepts when using multiple cascaded MIMIC devices in a radar system.

FIG. 1 shows a block diagram of an example of a radar signal processing chain 100.

A Radio Frequency (RF) transceiver frontend 110 is used to generate transmit (Tx) radar signals that can be emitted via one or more transmit antennas 112. The radar signals can be in frequency bands ranging from 3 MHz to 300 GHz, for example. Automotive radar systems may operate at bands in 24 GHz and 77 GHz portions of the electromagnetic spectrum known as mm-wave frequencies so that adequate velocity and range resolution can be achieved. One or more receive (Rx) antennas 114 may be used to receive electromagnetic waves (radar signals) reflected from targets. Radar operation involves range (distance), relative velocity, and possibly direction estimation related to the targets. The latter can be done when using more than one receive antenna in an receive antenna array. Radar systems using both multiple transmit and multiple receive antennas are commonly referred to as MIMO radars. For proper transmit antenna spacing, the multiple-input multiple-output (MIMO) radar can emulate a larger aperture phased array radar. This larger array may be called a virtual array.

Figure 2:
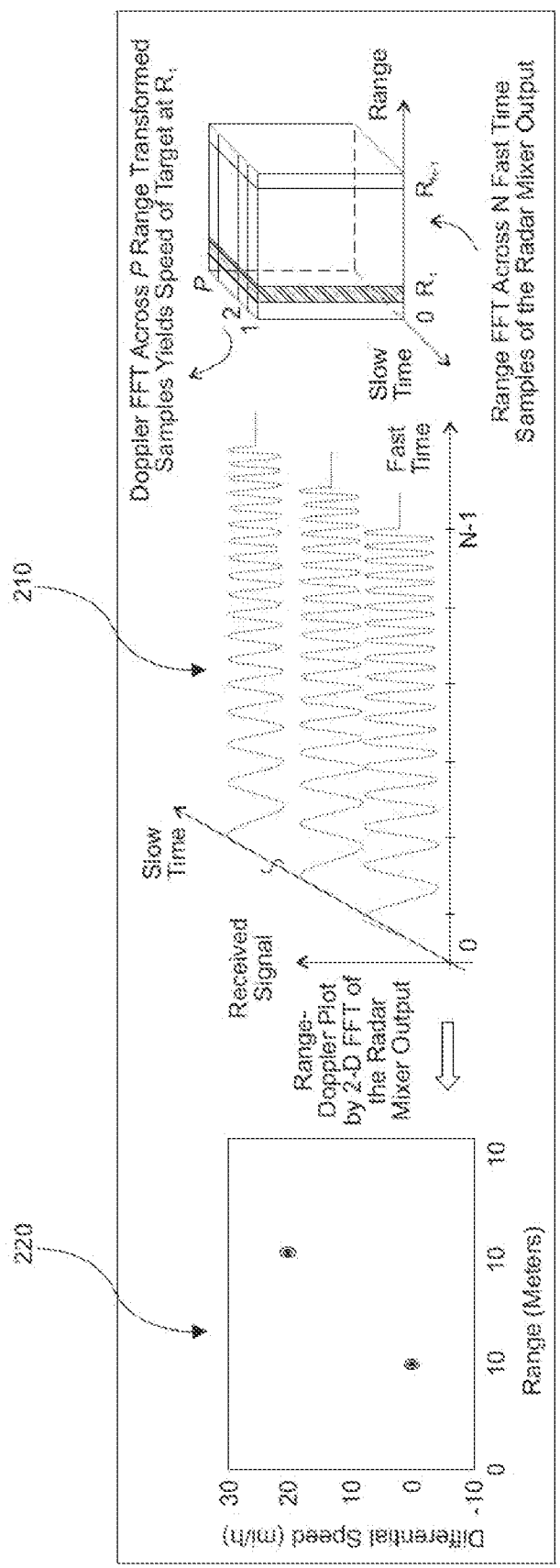
FIG. 2 shows a 2D joint range-Doppler estimation with FMCW radar, according to implementations of the present disclosure.

A range processor 120 downstream from the RF transceiver frontend 110 is configured to perform range estimation. A range R to a target, can be determined based on the round-trip time delay that the electromagnetic waves take to propagate to and from that target: $R=(c\tau/2)$, where $\tau$ is the round-trip time delay in seconds and c is the speed of light in meters per second. Thus, the estimation of $\tau$ enables the range measurement. With a radar configuration that uses frequency modulated (FM) CW pulses (sometimes referred as FMCW chirps or Ramps), simultaneous range-velocity estimation in multitarget traffic scenarios can be provided. A FMCW radar transmits periodic FM pulses (also referred to as chirps or ramps), whose frequency continuously increases (or continuously decreases) during the pulse. The receive signal reflected from a target is conjugately mixed with the transmit signal to produce a low-frequency beat signal (also referred to as baseband signal), whose frequency gives the range of the target. This operation can be repeated for P consecutive FMCW pulses. Two-dimensional (2D) waveforms 210 in FIG. 2 depict successive reflected pulses arranged across two time indices p, n. The so-called slow time index p simply corresponds to the pulse number. On the other hand, the so-called fast time index n assumes that for each pulse, the corresponding continuous beat signal is sampled with frequency $f_s$ to collect N samples within a pulse duration T.

The range processor 120 can be configured to perform a first discrete Fourier transform (e.g., FFT) across the fast time n to obtain beat frequency $f_b$ coupled with Doppler frequency $f_d$. This operation is also commonly known as range transform or range gating, which allows the estimation of Doppler shift corresponding to unique range gate or bin by the application of second Fourier transform (e.g., FFT) across the slow time. This can be done by speed processing element 130. Thus, a range-Doppler map 220 can be generated by using a 2D FFT, see FIG. 2. The range-Doppler map 220 comprises a 2D grid of range-Doppler cells or bins, each range-Doppler cell corresponding to a certain range and speed. An example range-Doppler map 220 illustrated in FIG. 2 shows two targets, a first one at 10 m distance and 0 miles/hour relative speed, and a second one at 20 m distance at 20 mi/h relative speed. The targets can be subregions of interest of the range-Doppler map.

So far, it has been assumed that automotive radars only receive the reflection from the targets of interest, such as vehicles traveling in front. However, in addition to direct reflections from a target of interest, the radar also receives reflections from the road debris, guard rails, and walls, for example. This unwanted return at the radar is typically called clutter. The amount of clutter in the system changes as the surrounding environment of the vehicle varies. Hence, adaptive algorithms such as constant false alarm rate (CFAR) processing can be used to mitigate the effect of clutter. To identify valid targets in the presence of clutter, a threshold for the target detection should be properly chosen. If the amplitude or energy of a range-Doppler map at an estimated range is greater than some threshold, for example, the target can be the to be detected. Thus, the threshold may depend on the noise (e.g. clutter) in the given system. As clutter increases, a higher threshold may be chosen. One possible CFAR method based on cell or bin averaging can use a sliding window to derive the local clutter level by averaging multiple range bins. This described threshold selection and target (peak) detection is performed in processing block 140.

The use of wideband pulses, such as FMCW pulses, provides discrimination of targets in both distance and velocity. The discrimination in direction can be made using a multi-antenna array, such as in multi-antenna radar systems. Multi-antenna radar systems can employ multiple transmitters, multiple receivers, and multiple waveforms to exploit all available degrees of freedom. To spatially resolve targets and deliver comprehensive representation of the traffic scene, angular locations of targets are estimated. Therefore, in automotive radars, the location of a target can be described in terms of a spherical coordinate system (R, θ, ρ), where (θ, ρ) denote azimuthal and elevation angles, respectively. A single antenna radar setup is sufficient to provide a range-velocity map but insufficient to provide angle information since the measured time delay lacks the information in terms of angular locations of the targets. To enable direction estimation, the radar is configured to receive reflected waves with multiple antennas. For example, locating a target using electromagnetic waves in two dimensions requires the reflected wave data from the object to be collected in two distinct dimensions. These distinct dimensions can be formed in many ways using combinations of time, frequency, and space across receive antennas. For instance, a linear receive antenna array 114 and wideband waveforms such as FMCW form two unique dimensions. Additionally, smaller wavelengths in mm-wave bands correspond to smaller aperture sizes and, thus, many antenna elements can be densely packed into an antenna array. Hence, the effective radiation beam, which is stronger and sharper, in turn increases the resolution of angular measurements.

Figure 3:
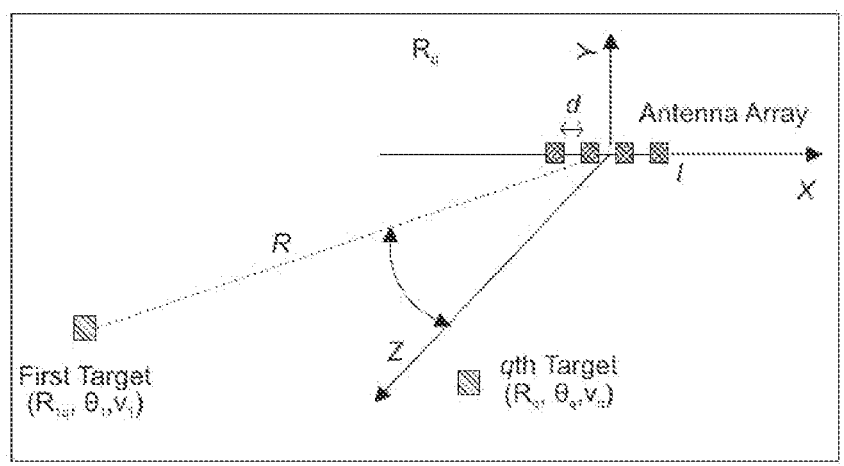
FIG. 3 illustrates azimuth angle estimation using a uniform linear antenna array, according to implementations of the present disclosure.

Consider an antenna array located in plane z=0, and let l be the abscissa corresponding to each receiver antenna position, see FIG. 3. Let $(R_q, \theta_q)$ be the position of the q-th target in spherical coordinates, moving with velocity $v_q$ relative to the radar. With the help of far field approximation, for the q-th target, the round-trip time delay between a transmitter located at the origin and the receiver positioned at coordinate l is given by $$\tau_{lq} = \frac{2(R_q + v_q t) + ld \sin \theta_q}{c},$$

where d is the distance between antenna elements (usually half the wavelength) arranged in a linear constellation. The delay term $\tau_{lq}$ creates uniform phase progression across antenna elements, which permits the estimation of the angle $\theta_q$ by FFT in spatial domain. Thus, 2D location (range and angle) and speed of targets can be estimated by a 3D FFT. The third angular FFT is performed in processing block 150 of the example radar signal processing block diagram of FIG. 1.

Further, automotive radar processing can include target clustering 160, target tracking 170, and optional sensor fusion 180 with sensor data of other environmental sensor types (e.g., camera, lidar, and/or the like).

In some implementations, high-resolution radar systems (e.g. MIMO radar systems) use a plurality of transmit and/or receive channels. However, the number of possible transmit and receive channels of a single radar MIMIC chip may be limited. Therefore, several MMIC chips can be cascaded, e.g., several radar transceiver MIMIC chips can be coupled, wherein one of the MMIC chips can serve as a master and provide a system clock for clock synchronization, a trigger signal to provide a pulse start signal, and a high-frequency signal for phase synchronization, etc. The other MMIC chips (slaves) provide additional transmission/reception channels for the radar system. As described herein, some implementations are directed to an efficient concept for distributing radar signal processing among different radar MMIC chips for the discrimination of targets in distance, velocity, and direction.

Figure 4:
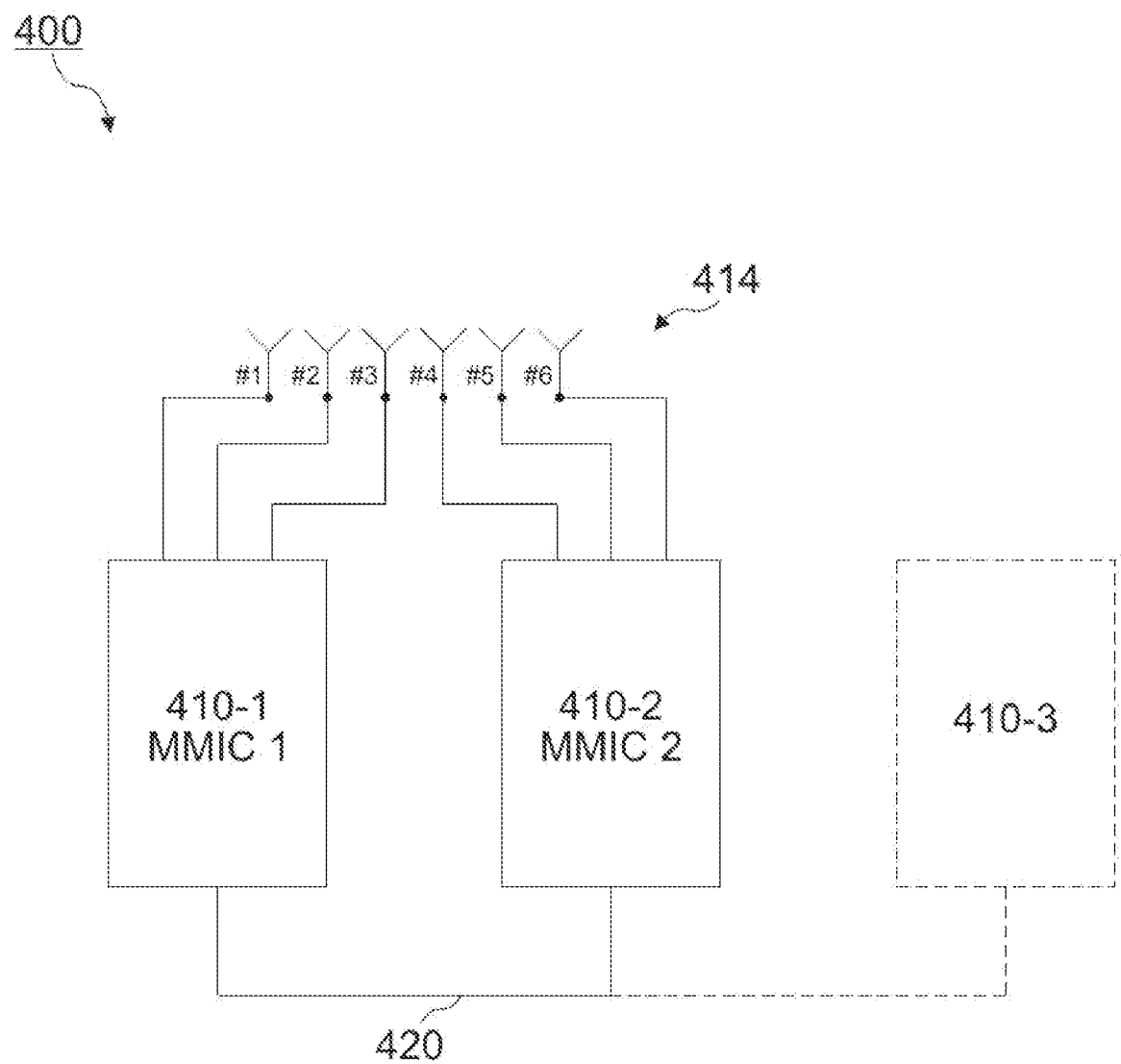
FIG. 4 shows a schematic block diagram of a radar device, according to implementations of the present disclosure.

FIG. 4 illustrates an example setup of a radar device 400 for distributing radar signal processing.

The radar device 400 includes a first radar-MMIC 410-1 and a second radar-MMIC 410-2. The first and second radar-MMICs 410-1, 410-2 can be cascaded. The radar-MMIC 410-1 may be coupled to first antennas (#1, #2, #3) of an antenna array 414, the second radar-MIMIC 410-2 may be coupled to different second antennas (#4, #5, #6) of the same antenna array. The antenna array 414 may be a linear antenna array, for example. The first radar-MMIC 410-1 is configured to process first receive signals from the first antennas (#1, #2, #3). In the illustrated example, the radar-MMIC 410-1 includes three receive chains. Each receive chain may include, for example, a low noise amplifier, a mixer and an analog-to-digital converter. In some implementations, the number of receive chains can be different. In some implementations, the radar-MMIC 410-1 may also include one or more transmitter chains with integrated power amplifier (PA), a synthesizer capable of delivering fast ramps for FMCW radar operation, integrated clock references and temperature sensors, for example. The first radar-MMIC 410-1 includes signal processing circuitry which is configured to determine a first combined range-Doppler map based on the (sampled) first receive signals and to determine a first subregion of the first combined range-Doppler map based on predetermined criteria. For example, the predetermined criteria can comprise amplitude or energy levels of range-Doppler map cells (FFT bins) above or below a predefined threshold. If the amplitude of the combined range-Doppler map at an estimated range/speed is greater than some (selection) threshold, for example, a peak of a first subregion of interest can be the to be detected. One or more such detected peaks can constitute a subregion of interest.

In some implementations, the first radar-MMIC 410-1 is configured to determine an antenna-specific range-Doppler map for each of the first receive signals of the active receive channels associated with the first radar-MMIC 410-1. Each of the first receive signals stems from a different antenna of the first antennas (#1, #2, #3). Thus, the first radar-MMIC 410-1 is configured to determine, for each antenna (#1, #2, #3) associated with the first radar-MMIC 410-1, an antenna-specific range-Doppler map. The first radar-MMIC 410-1 is further configured to generate the first combined range-Doppler map based on a linear combination of the antenna specific range-Doppler maps, such as a coherent or non-coherent summation or integration of the antenna-specific range-Doppler maps of the first receive signals.

Likewise, the second radar-MMIC 410-2 is configured to process second receive signals from second antennas (#4, #5, #6) of the antenna array 414. In some implementations, the hardware of the second radar-MMIC 410-2 essentially corresponds to the first radar-MMIC 410-1. The second radar-MMIC 410-2 includes signal processing circuitry which is configured to determine a second combined range-Doppler map based on the (sampled) second receive signals and to determine a second subregion of the second combined range-Doppler map based on the criteria of interest. The second radar-MMIC 410-2 may perform the same range-Doppler processing as the first radar-MMIC 410-1 however utilizing the second receive signals instead of the first receive signals. For example, if the amplitude of the combined range-Doppler map at an estimated range/speed is greater than some (selection) threshold, a peak of a second subregion of interest is detected. Again, one or more of the detected peaks can constitute a subregion of interest.

In some implementations, the second radar-MMIC 410-2 can be configured to determine an antenna-specific range-Doppler map for each of the second receive signals. Each of the second receive signals stems from a different antenna of the second antennas (#4, #5, #6). The second radar-MMIC 410-1 can be configured to determine the second combined range-Doppler map based on a linear combination such as a summation or integration of the antenna-specific range-Doppler maps of the second receive signals.

The radar device 400 further comprises a data interface 420 coupling the first radar-MMIC 410-1 with the second radar-MMIC 410-2. The data interface 420 may be configured to forward information indicative of the detected first and/or the second range-Doppler map subregions to a common processor for further processing. In some implementations, the common processor can be a remote processor or MMIC 410-3 different from the first and the second radar-MMICs 410-1, 410-2. In some implementations, a processor implemented in one of the first and the second radar-MMICs 410-1, 410-2 can act as the common processor. In some implementations, the data interface 420 can be a unidirectional data interface. In some implementations, the data interface 420 can be based on the Serial Peripheral interface (SPI) which is a synchronous serial communication interface. In some implementations, other implementations of high-speed inter-IC communication interfaces are possible as well.

In some implementations, cell or bin indices (p, n) of the detected first and/or second subregions can be forwarded to the common processor via the data interface 420. Bin indices of subregions of no interest (non-detected subregions) may be selected not to be forwarded to the common processor. In this way, communication bandwidth can be reduced and/or processing can be sped up, and the common processor may nonetheless reconstruct the detected subregions. Whether the first, the second or both detected subregions are selected to be forwarded via the data interface 420 depends on the implementation of the common processor. In some implementations, it may be sufficient to only forward information related to the first detected subregion(s) to the second radar-MMIC 410-2 if the second radar-MMIC 410-2 acts as the common processor. Optionally, complex amplitude values associated with the bin indices of the detected first and/or second subregions can be additionally forwarded to the common processor via the data interface 420. This can be done across all antennas of the respective radar-MMIC such that a discrete Fourier transform (FFT) on the detected subregions can be performed at a later stage for angle estimation.

The common processor may be configured to combine the first and the second signal subregions, e.g. via a logic OR combination of the range-Doppler cells (FFT bins), to obtain one or more combined subregions. For example, each of the range-Doppler cells of the first subregion may be represented in a first logical map as a logical value 1 while the range-Doppler cells not within the first subregion may be represented as a logical value 0. Similar, the range-Doppler cells of the second subregion may be represented in a second logical map as a logical value 1 while the range-Doppler cells not within the second subregion may be represented as a logical value 0. By an OR-combination of the logical values of the respective first and second logical maps for each range-Doppler cell, a combined logical map may be obtained in which the combined subregions may be represented by the resulting logical values 1. Based on the one or more combined subregions and additional phase information (across antennas) associated with the one or more combined subregions a third discrete Fourier transform across antennas for directional or angular processing may then be performed.

Figure 5:
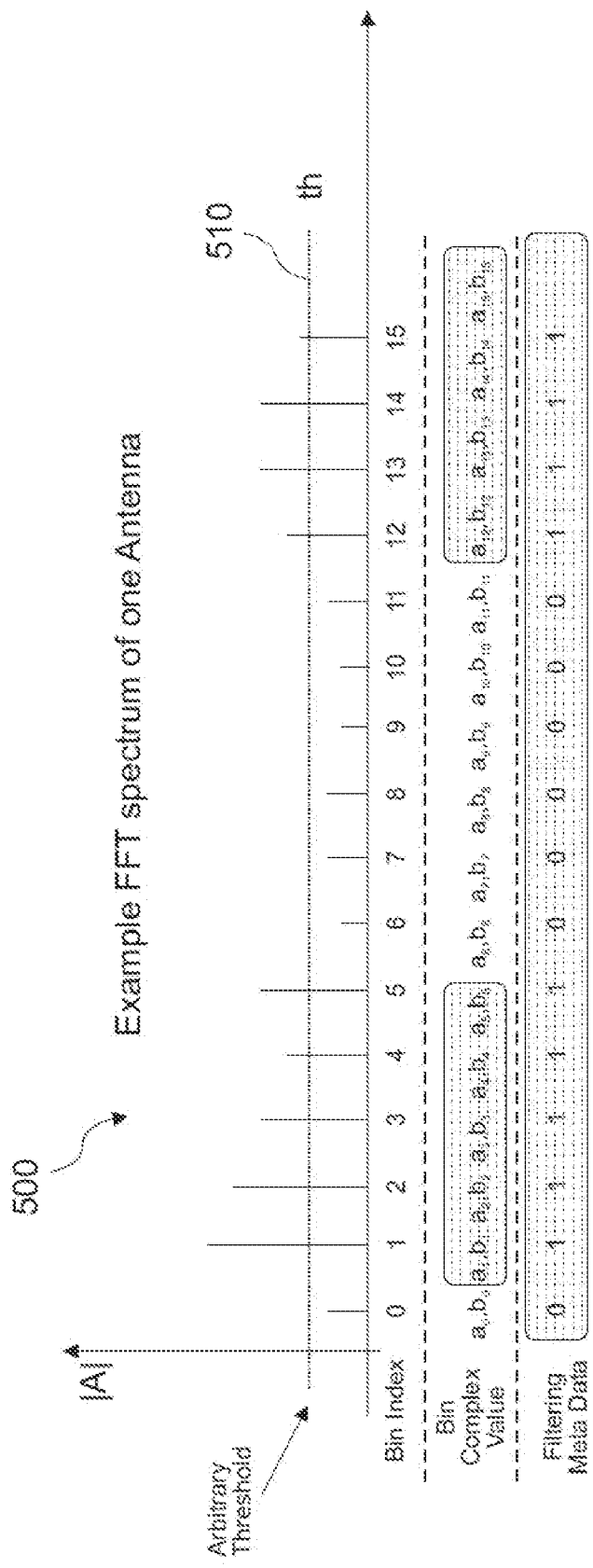
FIG. 5 shows an example of exchanged data, according to implementations of the present disclosure.

An example of detected subregion data that can be exchanged via the data interface 420 is shown in FIG. 5.

FIG. 5 illustrates an example FFT spectrum 500 of one receive antenna with 16 FFT bins (from index 0 to 15). Each range-Doppler cell or FFT bin i (i=0 . . . 15) has an associated complex value ($a_i$, $b_i$) and an amplitude $A_i$. The amplitude values $A_i$ are compared against a fixed or adaptive threshold value th, 510. If $A_i$>th, the corresponding range-Doppler cell i is the to be detected or to belong to a subregion of interest. In the illustrated example, range-Doppler cells 1, 2, 3, 4, 5, 12, 13, 14, and 15 are detected and hence constitute a subregion of interest. A metadata vector (binary map) of length 16 can be forwarded indicating the detected range-Doppler cells 1, 2, 3, 4, 5, 12, 13, 14, and 15. Here, the metadata vector has "1" at positions 1, 2, 3, 4, 5, 12, 13, 14, and 15 and "0" otherwise. The "1" in the metadata vector indicate the subregion(s) of interest. Further, the complex values ($a_i$, $b_i$) associated with the detected range-Doppler cells 1, 2, 3, 4, 5, 12, 13, 14, and 15 can be forwarded via the data interface 420. The complex values associated with the non-detected range-Doppler cells 0, 6, 7, 8, 9, 10, and 11 need not be forwarded. According to the example of FIG. 5, only complex values ($a_i$, $b_i$) indicative of amplitude and phase of the detected range-Doppler cells may be transmitted (per receive antenna), while the logical values (metadata) may be transmitted for all range-Doppler cells. Since the complex values ($a_i$, $b_i$) include the respective phase of the receive signal, the illustrated data format example of FIG. 5 also inherently includes information indicative of phases or phase progressions of the first and/or the second receive signals, which can be used for obtaining spatial information on the subregion(s) of interest.

Multiple of such FFT spectra or range-Doppler maps, each associated with a respective receive antenna, can be coherently or non-coherently integrated in each of the first and second radar-MMICs 410-1, 410-2. Coherent integration is performed before amplitude detection and thus preserves phase information, while a non-coherent integration is performed after amplitude detection and thus lacks phase information. FIG. 5 can therefore represent for example a FFT spectrum resulting from a coherent or non-coherent integration of multiple antenna specific FFT spectra.

In some implementations, the second radar-MMIC 410-2 may be configured to implement the common processor. In such cases the first radar-MMIC 410-1 may be configured to forward information indicative of phases of the first receive signals (phase progression across antenna elements #1, #2, #3) to the radar-MMIC 410-2 via the data interface 420. As described above, such phase information may be inherent to complex values ($a_i$, $b_i$) associated with the detected bins/subregions. The complex values ($a_i$, $b_i$) of the detected range-Doppler cells across all first antenna elements #1, #2, #3 may be used to perform the spatial or angle FFT. Then the second radar-MMIC 410-2 may be configured to determine spatial directions (e.g. azimuthal or elevation angles) of the detected subregions based on the combined detected subregions from the first and second radar-MMICs 410-1, 410-2 and based on the phases of the first and the second receive signals. Here, the complex values ($a_i$, $b_i$) of the detected range-Doppler cells across all antenna elements #1, #2, #3, #4, #5, #6 may be used to perform the spatial or angle FFT. Thus, an FFT on the combined detected subregions across all antennas of the antenna array can be performed to estimate the angle(s).

Figure 6A:
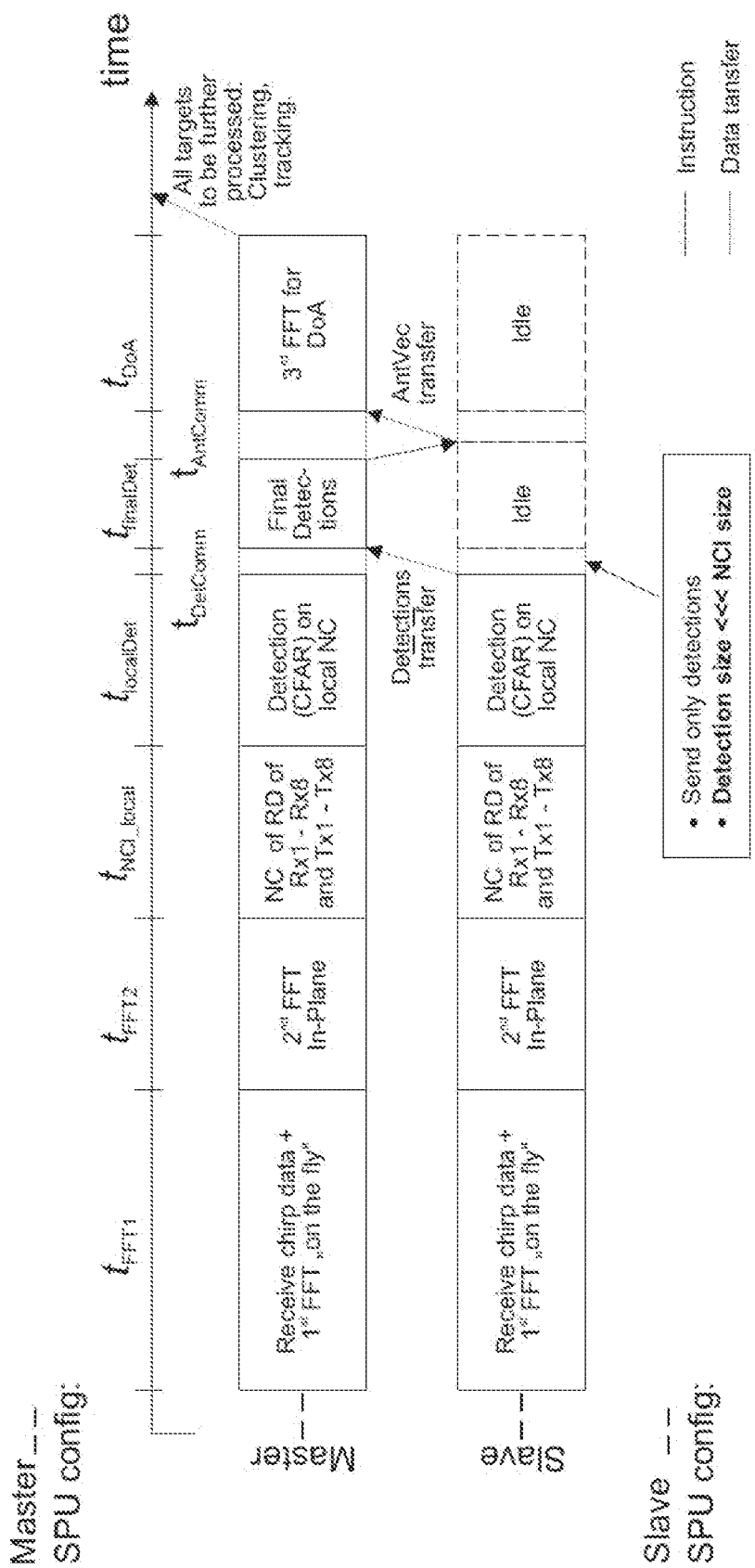
FIG. 6a shows an example signal flow in accordance with an example implementation of the present disclosure.

An example signal flow in accordance with such implementations is shown in FIG. 6a.

FIG. 6a illustrates an example temporal signal processing course of the first and second radar-MMICs 410-1, 410-2. Here, the second radar-MMIC 410-2 acts as the master MIMIC, while the first radar-MMIC 410-1 acts as the slave MMIC. The FMCW signal ramps are generated in the second radar-MMIC 410-2 and are distributed to the first radar-MMIC 410-1. Thus, both radar-MMICs 410-1, 410-2 use the same FMCW signal ramps for transmitting and receiving in a synchronized way.

During a first time-interval $t_{FFT1}$ both radar-MMICs 410-1, 410-2 perform a respective first FFT (range FFT) of respective (sampled) receive signals. This is done for each receive channel.

During a subsequent second time-interval $t_{FFT2}$ both radar-MMICs 410-1, 410-2 perform a respective second FFT (Doppler FFT) across the slow time (subsequent pulses). Again, this is done for each receive channel. In this way range-Doppler maps for all respective receive channels can be obtained. When a target is illuminated by the radar beam it typically reflects numerous pulses. The probability of detection can be enhanced by summing or integrating all the range-Doppler map data of all Tx-Rx antenna pairs. In the illustrated implementation, each radar-MMIC 410-1, 410-2 is coupled to 8 receive antennas. Thus, a virtual antenna array of 8 transmit antennas and 16 receive antennas can be formed by using the radar-MMICs 410-1, 410-2.

In the illustrated implementation, both radar-MMICs 410-1, 410-2 perform a non-coherent integration (NCI) of the range-Doppler maps for all respective receive- and transmit channels associated with the respective radar-MMIC during a subsequent time-interval $t_{NCI\_local}$.

During a subsequent time-interval $t_{localDet}$, both radar-MMICs 410-1, 410-2 detect respective subregions of the respective combined (NCI) range-Doppler map based on the criteria of interest and provide the logical representation whether a range-Doppler cell (FFT bin) is within a detected subregion or not. As mentioned before, the subregions may contain range-Doppler cells associated with NCI amplitudes above a certain threshold, for example. In a subsequent short communication time-interval $t_{DetComm}$ the information of detected range-Doppler map subregions of the first radar-MMIC 410-1 may be communicated to the second radar-MMIC 410-2 via the data interface 420. This can be done in accordance with the example data format of FIG. 5, for example. The metadata vector and optionally the complex values $(a_i, b_i)$ (for all Tx-Rx antenna pairs of the first radar-MMIC 410-1) associated with the detected range-Doppler cells may thus be forwarded from the first radar-MMIC 410-1 to the second radar-MIMIC 410-2 via the data interface 420. As described above, transmitted information related to the detected range-Doppler map subregions may include for each range-Doppler cell within the subregion the amplitude and phase information and the 1-Bit information whether the range-Doppler cell is within a subregion. For range-Doppler cells which are not within the detected subregions, only the 1-Bit information whether the range-Doppler cell is within a subregion may be transmitted. Note that an amount of data required to transfer the detected range-Doppler map subregions is much lower than transferring the range-Doppler map data of all antennas before NCI.

During a subsequent time-interval $t_{finalDet}$ the second radar-MMIC 410-2 may combine the detected range-Doppler map subregions of the first radar-MIMIC and the detected range-Doppler map subregions of the second radar-MMIC via a logic OR to obtain combined detected subregions.

During a subsequent short time-interval $t_{finalDet}$, the second radar-MIMIC 410-2 may request from the first radar-MIMIC 410-1 additional phase information associated with combined detected subregions which were not within the previously detected range-Doppler map subregions of the first radar-MIMIC. This additional phase information associated with the missing subregions may be forwarded from the first radar-MIMIC 410-1 to the second radar-MMIC 410-2 via the data interface 420 in form of complex values $(a_i, b_i)$, for example.

The requested additional phase information is then transferred from the first radar-MIMIC 410-1 to the second radar-MMIC 410-2 during subsequent time-interval $t_{AntComm}$.

Then the second radar-MMIC 410-2 has obtained the information which allows generating the directional or angular information for the combined subregions via a third (angular) FFT across all antennas during time-interval $t_{DoA}$. Range information, speed information, and angular information of the detected (combined) subregions can then be forwarded to a remote processor, such as an ECU of a vehicle, for example. Another option would be to perform the third (angular) FFT at the external processor, such as the ECU.

Figure 6B:
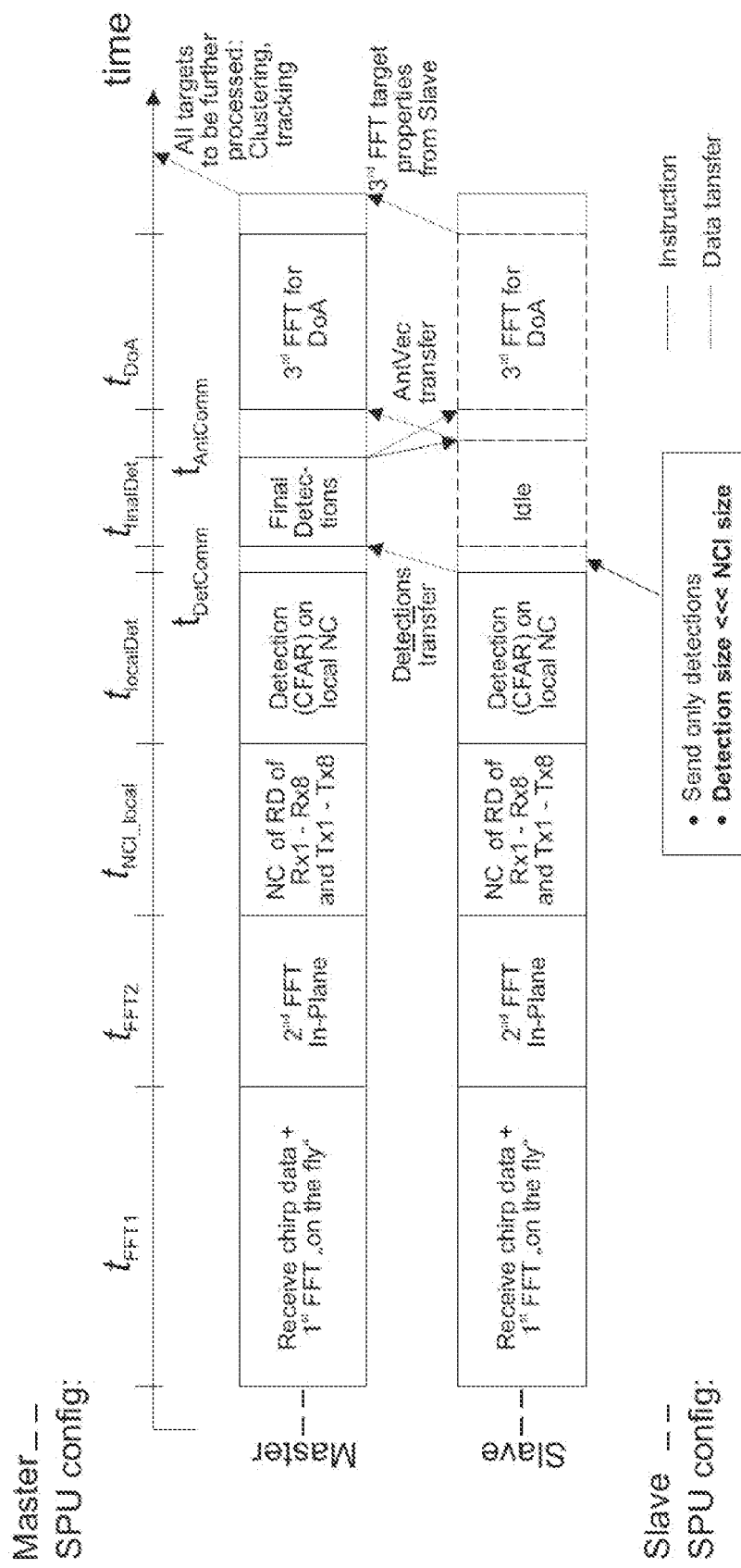
FIG. 6b shows an example signal flow in accordance with another example implementation of the present disclosure.

The example temporal signal processing of FIG. 6b differs from FIG. 6a in that the third (angular) FFT is alternatively or additionally performed on the first radar-MIMIC 410-1 during time-interval $t_{DoA}$. In FIG. 6b, the second radar-MMIC 410-2 is configured to forward the combined subregions and associated information indicative of phases of the second receive signals to the first radar-MMIC 410-1 via the data interface 420 during time-interval $t_{AntComm}$. Then, the first radar-MMIC 410-1 can determine the spatial directions of the combined subregions (target objects) based on an FFT on range-Doppler cells of the combined subregions across the first and the second antennas.

Figure 7A:
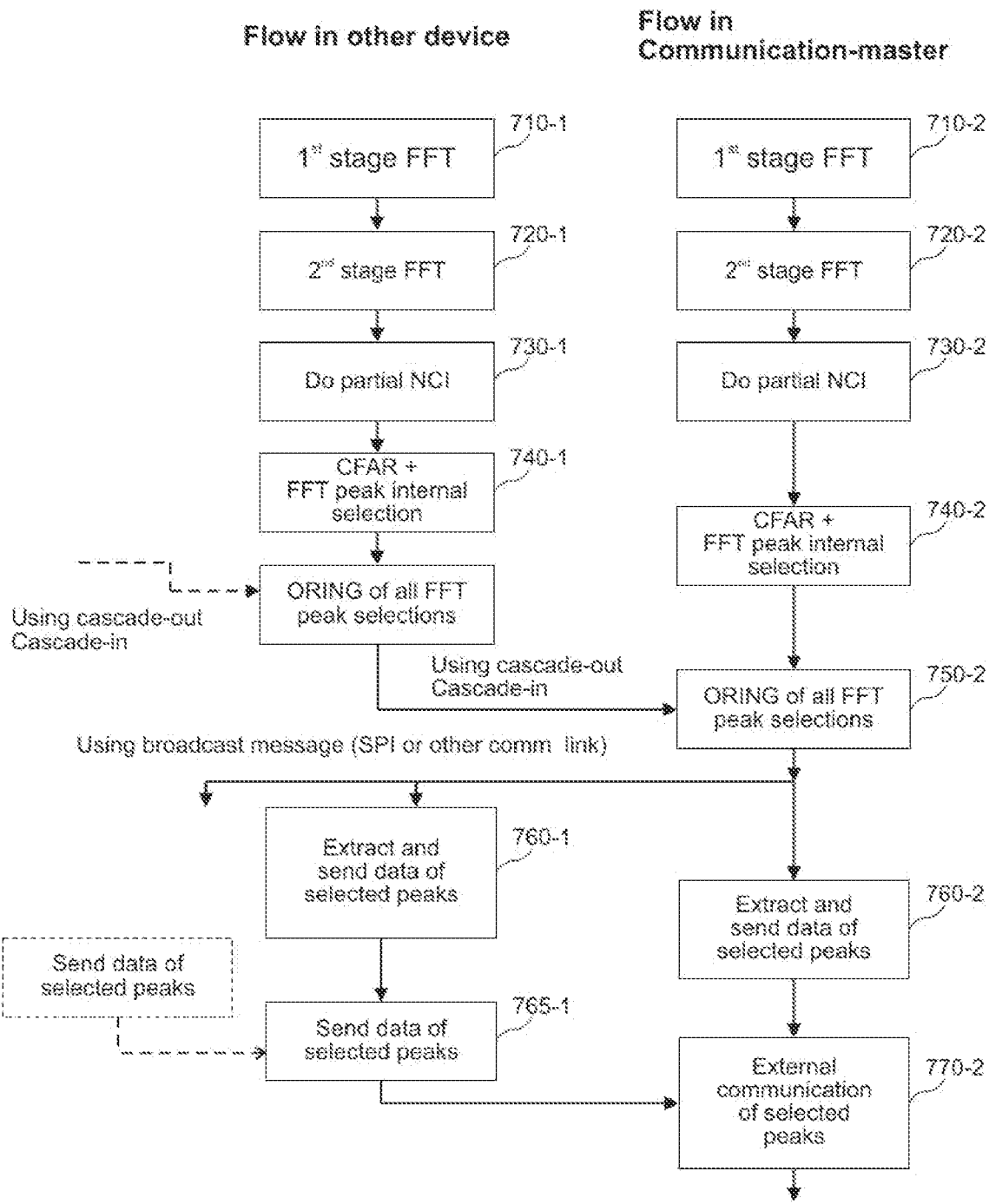
FIG. 7a shows a flowchart of distributed radar signal processing according to an example implementation of the present disclosure.
Figure 7B:
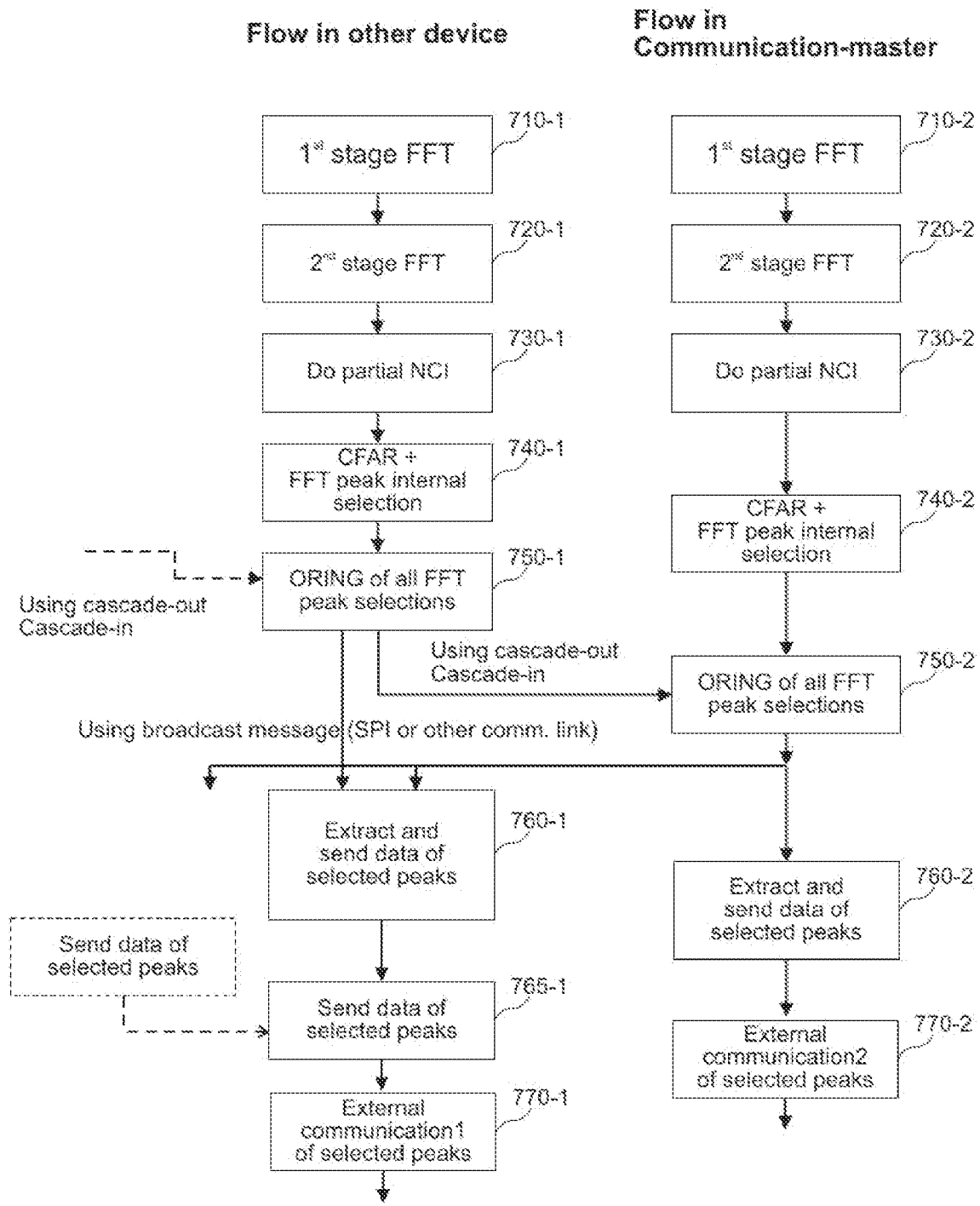
FIG. 7b shows a flowchart of distributed radar signal processing according to another example implementation.

FIGS. 7a and 7b illustrate flowcharts in accordance with the temporal signal processing courses of FIGS. 6a and 6b. In FIGS. 7a and 7b, the right column corresponds to acts performed in the master device (e.g. second radar-MMIC 410-2), while the left column corresponds to acts performed in the slave device (e.g. first radar-MMIC 410-1).

In respective first acts 710-1, 710-2 both radar-MMICs 410-1, 410-2 perform a respective first FFT (range FFT) of respective receive signals. This can be done for every receive channel. In subsequent second acts 720-1, 720-2 both radar-MMICs 410-1, 410-2 perform a respective second FFT (Doppler FFT) across the slow time. Again, this can be done for every receive channel. Thus, after the second acts 720-1, 720-2 receive-channel-specific range-Doppler maps are available in both radar-MMICs 410-1, 410-2. In subsequent third acts 730-1, 730-2 both radar-MMICs 410-1, 410-2 perform non-coherent integration (NCI) of their respective receive-channel-specific range-Doppler maps for all respective receive (and transmit) channels to obtain respective partially integrated (NCI) range-Doppler maps.

In subsequent fourth acts 740-1, 740-2 both radar-MMICs 410-1, 410-2 detect respective range-Doppler cells (peaks) of the respective partially integrated (NCI) range-Doppler map based on the criteria of interest, e.g. in accordance with a predetermined selection criterion. The detected range-Doppler cells of the first radar-MMIC 410-1 are then communicated to the second radar-MMIC 410-2 via the data interface 420. As indicated in FIG. 7a, the detected range-Doppler cells of the first radar-MMIC 410-1 can already be combined (logical OR) with detected range-Doppler cells of another radar-MMIC (not shown). In this way, a cascade of various radar-MMICs can be implemented wherein each radar-MMIC detects respective range-Doppler cells and forwards these to the next radar-MMIC of the cascade.

A binary map (0 and is indicating the respective subregions) can be provided from each MMIC to the next MMIC in the cascade and each MMIC receiving the binary map can further combine the binary maps at 750-1.

Finally, the communication master can generate a final binary map at 750-2 indicating the final detected range-Doppler cells by combining the received binary map with its own binary map. This information on the final detected range-Doppler cells indicated by the final binary map may then be distributed to each of the MMICs with a request to extract and send the related phase information (and amplitude information) to the communication master at 765-1. The communication master may then either calculate the angular FFT or send the data to an external ECU for calculating the angular FFT at 770-1, 770-2.

In the flowchart of FIG. 7b, the information on the final detected range-Doppler cells indicated by the final binary map is distributed to each of the MMICs with a request to extract and send the related phase information (and amplitude information). In some implementations, as shown in FIG. 7b, the individual MMICs may send the related phase information (phase progression across antennas) to an external ECU, for example. The ECU may then calculate the angular FFT based on the information received from the MMICs.

Figure 7C:
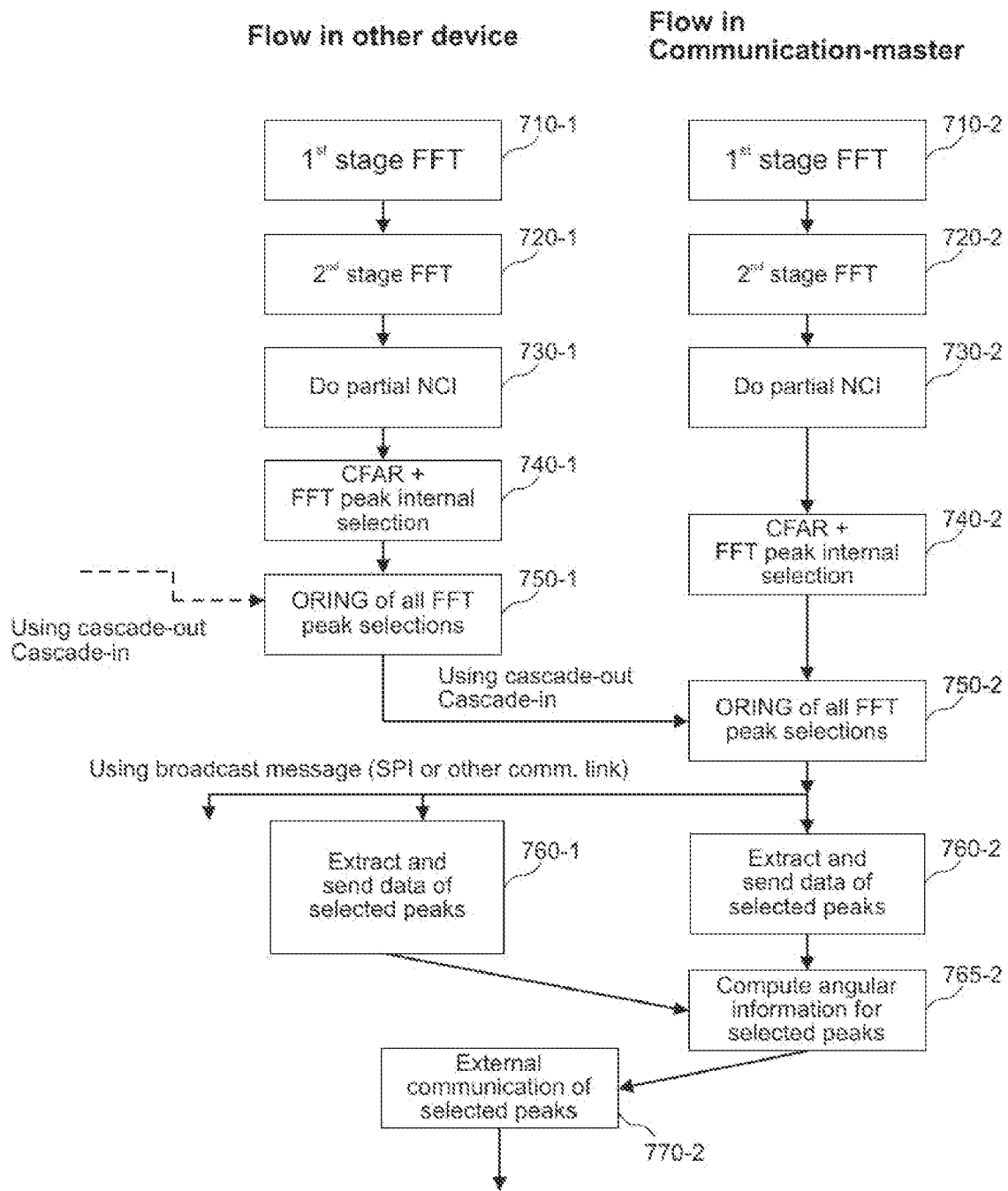
FIG. 7c shows a flowchart of distributed radar signal processing according to a further example implementation of the present disclosure.

In the flowchart of FIG. 7c, the information on the final detected range-Doppler cells indicated by the final binary map is distributed from the second radar-MMIC 410-2 (master) to each of the (slave) MMICs with a request to extract and send the respective related phase information (and amplitude information) back to the second radar-MMIC 410-2 via the data interface 420. In act 765-2, the second radar-MMIC 410-2 may then calculate the angular FFT related to the final detected range-Doppler cells based on the related phase information received from the other MMICs. The information on the final detected range-Doppler cells indicated by the final binary map together with the related angular information obtained from act 765-2 may then be forwarded 770-2 to an external ECU via an Ethernet link, for example. Hence, the flowchart of FIG. 7c illustrates an implementation with angular processing done by the second radar-MMIC 410-2.

Figure 7D:
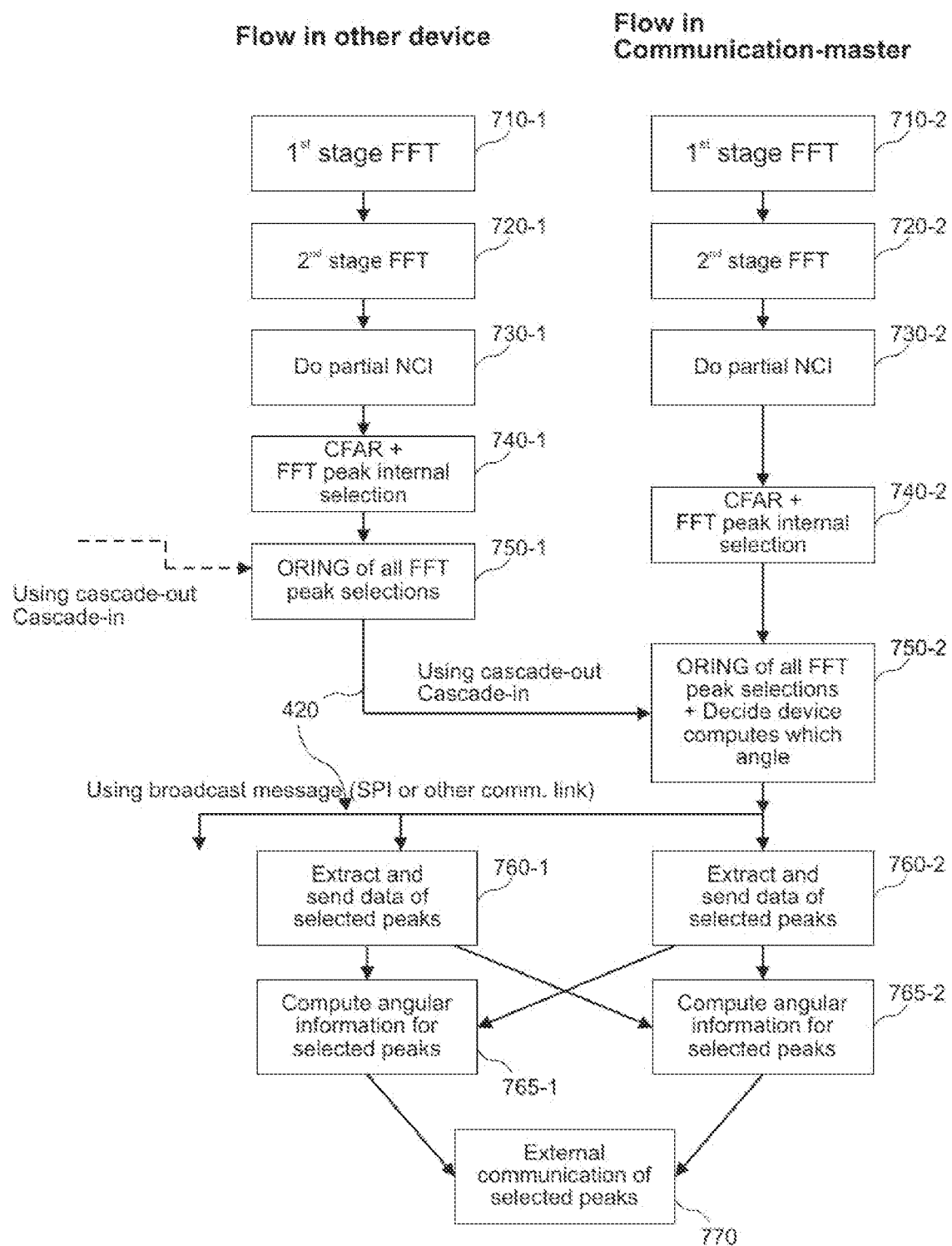
FIG. 7d shows a flowchart of distributed radar signal processing according to yet a further example implementation of the present disclosure.

In the flowchart of FIG. 7d, the information on the final detected range-Doppler cells indicated by the final binary map, e.g. the result of act 750-2, may then be distributed among the other (slave) MMICs. This distribution may include a selection or assignment which other (slave) MMIC should compute which angular information. In other words, second radar-MMIC 410-2 (master) may select first radar-MMIC 410-1 to compute first angular information (via an angular FFT) for a first subset of the final detected range-Doppler cells (peaks), while second radar-MMIC 410-2 may be selected to compute second angular information (via an angular FFT) for a second subset of the final detected range-Doppler cells (peaks). Likewise, a third radar-MMIC may be selected to compute third angular information for a third subset of the final detected range-Doppler cells. The selection may be based on a computation criterion, such as a computation load balancing criterion, for example. The skilled person having benefit from the present disclosure will appreciate that the radar-MMICs can share phase information associated with the assigned range-Doppler cells via the data interface 420. For example, phase information associated with the first subset of the final detected range-Doppler cells can be provided to the first radar-MMIC 410-1 from second radar-MMIC 410-2 (and any further radar-MMICs). Phase information associated with the second subset of the final detected range-Doppler cells can be provided to the second radar-MMIC 410-2 from first radar-MMIC 410-1 (and any further radar-MMICs), and so on. Information on the different subsets of final detected range-Doppler cells (peaks) together with the related angular information obtained from acts 765-1, 765-2 may then be forwarded 770 to an external ECU via an Ethernet link, for example. Hence, the flowchart of FIG. 7d illustrates an implementation with distributed angular processing among the different radar-MMICs 410-1, 410-2.

Figure 7E:
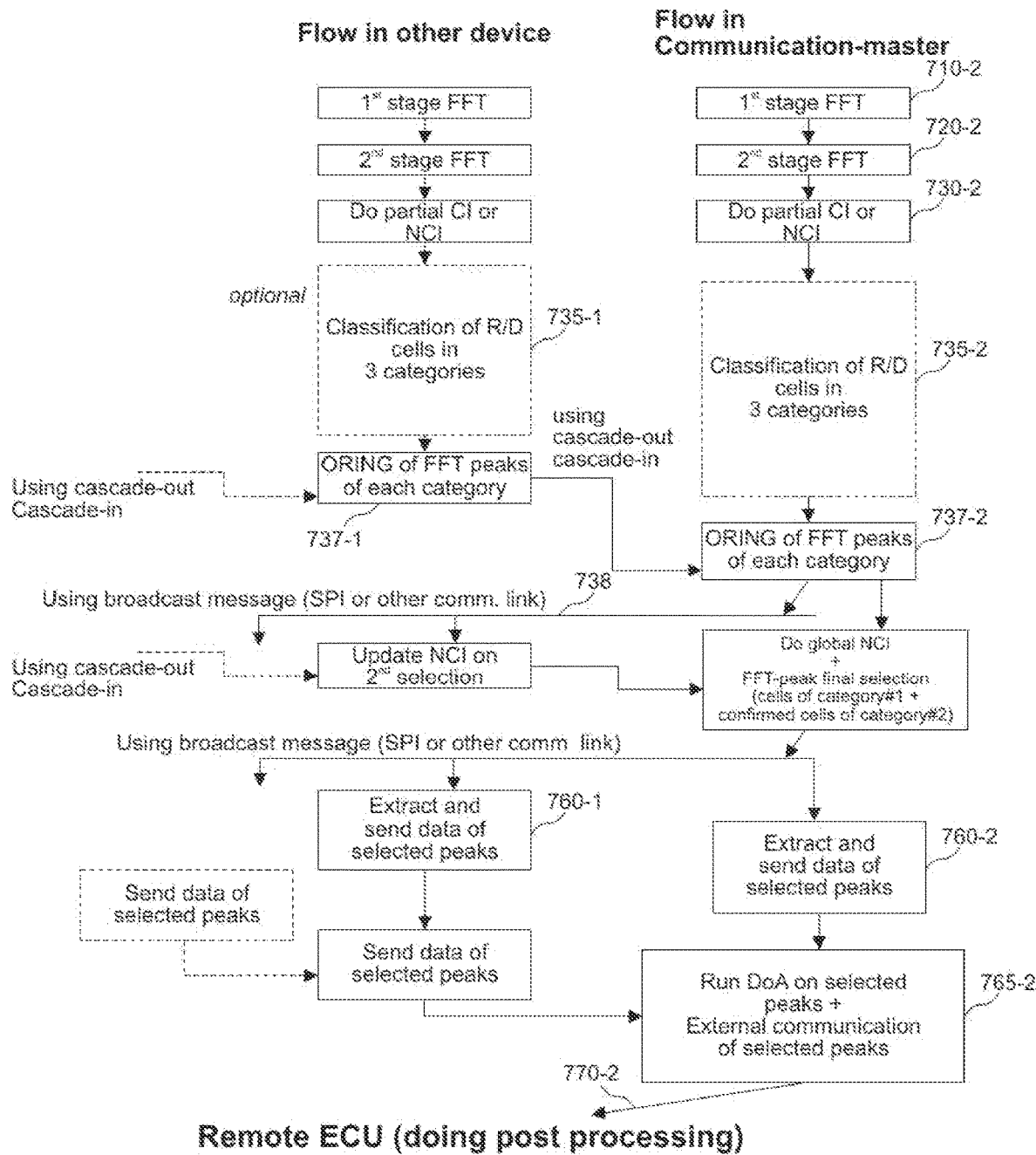
FIG. 7e shows a flowchart of distributed radar signal processing according to an example implementation of the present disclosure.

The distributed processing concept of FIGS. 7a-7d may be further improved with respect to latency by a distributed signal processing concept depicted in FIG. 7e.

Again, in FIG. 7e, the right column corresponds to acts performed in the master device (e.g. second radar-MMIC 410-2), while the left column corresponds to acts performed in the slave device (e.g. first radar-MMIC 410-1).

In respective first acts 710-1, 710-2 both radar-MMICs 410-1, 410-2 perform a respective first FFT (range FFT) of respective receive signals. This can be done for every receive channel. In subsequent second acts 720-1, 720-2 both radar-MMICs 410-1, 410-2 perform a respective second FFT (Doppler FFT) across the slow time. Again, this can be done for every receive channel. Thus, after the second acts 720-1, 720-2 receive-channel-specific range-Doppler maps are available in both radar-MMICs 410-1, 410-2. In subsequent third acts 730-1, 730-2 both radar-MMICs 410-1, 410-2 may perform coherent integration (CI) or non-coherent integration (NCI) of their respective receive-channel-specific range-Doppler maps for all respective receive (and transmit) channels to obtain respective combined range-Doppler maps. Here, "combined" refers to a combination over the respectively associated receive channels by coherent integration (CI) or non-coherent integration (NCI).

In subsequent acts 735-1, 735-2 both radar-MMICs 410-1, 410-2 may detect respective categories of range-Doppler cells of the respective combined range-Doppler map based on a plurality of predetermined criteria. In some implementations, there may be three categories of range-Doppler cells: selected range-Doppler cells, confirmable range-Doppler cells, and non-selected range-Doppler cells. The selected range-Doppler cells match a predetermined selection criterion and may be regarded as final peak selections. The confirmable range-Doppler cells match a predetermined confirmation criterion and need further evaluation. The non-selected range-Doppler cells do neither match the predetermined selection criterion nor the predetermined confirmation criterion and may be regarded as final discarded.

In some implementations, the predetermined selection criterion may comprise a range-Doppler cell amplitude or energy level above a first threshold. That is to say, the predetermined selection criterion may be met if an amplitude or energy level of a range-Doppler cell of a combined range-Doppler map is equal to or exceeds the first threshold. In this case, the range-Doppler cell may be classified as selected range-Doppler cell. The predetermined confirmation criterion may comprise a range-Doppler cell amplitude or energy level below the first threshold and above a second threshold. That is to say, the predetermined confirmation criterion may be met if an amplitude or energy level of a range-Doppler cell of a combined range-Doppler map is between the second and the first threshold. In this case, the range-Doppler cell may be classified as confirmable range-Doppler cell. Amplitude or energy levels of non-selected range-Doppler cells may be below the second threshold.

In some implementations, the predetermined confirmation criterion may comprise a range level above a first threshold. That is to say, the predetermined confirmation criterion may be met if a range level of a range-Doppler cell of a combined range-Doppler map is equal to or exceeds the first threshold. In this case, the range-Doppler cell may be classified as confirmable range-Doppler cell. The predetermined selection criterion may comprise a range level below the first threshold and above a second threshold. That is to say, the predetermined selection criterion may be met if a range level of a range-Doppler cell of a combined range-Doppler map is between the second and the first threshold. In this case, the range-Doppler cell may be classified as selected range-Doppler cell. Range levels of non-selected range-Doppler cells may be below the second threshold.

In some implementations, the respective confirmable range-Doppler cells identified by the radar-MMICs 410-1, 410-2 may utilize an extra (external) evaluation or confirmation as to whether they will be classified as selected or non-selected range-Doppler cells in the end. Selected range-Doppler cells may indicate a target object, while non-selected range-Doppler cells may be disregarded for target detection. In some implementations, fewer categories of range-Doppler cells may be used. For example, only confirmable range-Doppler cells or confirmable range-Doppler cells and non-selected range-Doppler cells may be used.

In act 735-1, the first radar-IC 410-1 may locally determine first selected range-Doppler cells of the respective first combined range-Doppler map matching the predetermined selection criterion. Further, the first radar-IC 410-1 may locally determine first confirmable range-Doppler cells of the first combined range-Doppler map matching a predetermined confirmation criterion. Yet further, the first radar-IC 410-1 may locally determine first non-selected range-Doppler cells of the first combined range-Doppler map neither matching the predetermined selection criterion nor the predetermined confirmation criterion. Likewise, in act 735-2 the second radar-MMIC 410-2 may locally determine second selected range-Doppler cells of the respective second combined range-Doppler map matching the predetermined selection criterion. Further, the second radar-MMIC 410-2 may locally determine second confirmable range-Doppler cells of the second combined range-Doppler map matching the predetermined confirmation criterion. Yet further, the second radar-MMIC 410-2 may locally determine second non-selected range-Doppler cells of the second combined range-Doppler map neither matching the predetermined selection criterion nor the predetermined confirmation criterion. In some implementations, more than the two radar-MMICs 410-1, 410-2 may be involved.

As indicated at 737-1, 737-2, the range-Doppler cells of each category coming from the first radar-MMIC 410-1 can already be logically combined (e.g. logical OR) with respective range-Doppler cells of the same category coming from another radar-MMIC (not shown). In this way, a cascade of various radar-MMICs can be implemented wherein each radar-MMIC detects respective range-Doppler cells of different categories (selected, confirmable, non-selected) and forwards these to the next radar-MMIC of the cascade. For each category, a binary map (0 and 1s indicating the respective classified range-Doppler cells) can be provided from each MMIC to the next MMIC in the cascade and each MMIC receiving the binary maps can further combine the binary maps. For example, in an implementation comprising merely two radar-MMICs 410-1, 410-2, the second radar-IC 410-2 may combine the first and second selected range-Doppler cells via a logic OR to obtain a combined set of selected range-Doppler cells (as final peak detections), combine the first and second confirmable range-Doppler cells via a logic OR to obtain combined set of confirmable range-Doppler cells (as confirmable peak detections), and to combine the first and second non-selected range-Doppler cells via a logic OR to obtain a combined set of non-selected range-Doppler cells. Other logical combinations may be possible as well.

Subsequently, at 738, the communication master (here: second radar-IC 410-2) may communicate a binary map corresponding to the combined set of confirmable range-Doppler cells (confirmable peak detections) to each of the MMICs with a request to extract and send the related (complex) values (e.g. amplitude and phase) of the respective combined range-Doppler maps to the communication master for a global coherent or non-coherent integration. That is, amplitude and phase information of each range-Doppler cell of the combined set of confirmable range-Doppler cells (confirmable peak detections) may be requested from the slaves by the communication master.

Subsequently, each radar-MMIC communicates (complex) values of its radar-MMIC-specific combined range-Doppler map corresponding to the combined set of confirmable range-Doppler cells to the communication master (here: second radar-IC 410-2). That is, amplitude and phase information of each range-Doppler cell of the combined set of confirmable range-Doppler cells (confirmable peak detections) may be communicated from the slaves to the communication master.

Subsequently, the communication master (here: second radar-IC 410-2) performs a coherent or non-coherent integration of the received (complex) values of the radar-MMIC-specific combined range-Doppler maps corresponding to the combined set of confirmable range-Doppler cells (confirmable peak detections) to obtain summed or integrated values of the combined set of confirmable range-Doppler cells. That is, amplitude (and phase) information of each range-Doppler cell of the combined set of confirmable range-Doppler cells may be coherently or non-coherently integrated over all antennas and over all radar-MMICs. Thus, the second radar-IC 410-2 performs a global coherent or non-coherent integration of the combined set of confirmable range-Doppler cells. Further, the second radar-IC 410-2 may select summed or integrated values of the combined set of confirmable range-Doppler cells exceeding a predefined threshold (e.g. the selection threshold or another threshold) as further selected range-Doppler cells (further final peak detections). Summed or integrated values of the combined set of confirmable range-Doppler cells not exceeding the predefined threshold may be discarded as non-selected range-Doppler cells. Together with the previously (or subsequently) determined combined set of selected range-Doppler cells, the further selected range-Doppler cells (based on the confirmation) may form a final set of selected range-Doppler cells (final peak detections).

At 760-1, 760-2, the information on the final detected range-Doppler cells indicated by the final binary map may then be distributed from the second radar-MMIC 410-2 (master) to each of the (slave) MMICs with a request to extract and send the respective related phase information (and amplitude information) back to the second radar-MMIC 410-2 via the data interface 420. In act 765-2, the second radar-MMIC 410-2 may then calculate the angular FFT related to the final set of selected range-Doppler cells based on the related phase information received from the other MMICs. The information on the final detected range-Doppler cells indicated by the final binary map together with the related angular information obtained from act 765-2 may then be forwarded 770-2 to an external ECU via an Ethernet link, for example. Hence, the flowchart of FIG. 7e illustrates an implementation with angular processing done by the second radar-MMIC 410-2.

The implementation illustrated in FIG. 7e proposes to identify three categories of range-Doppler cells (while less categories are also conceivable).

1: range-Doppler cells that meet selection criterion and that do not need to be shared to external processing device for confirmation;

2: range-Doppler cells that meet confirmation criterion and that needs to be confirmed by information from an external processing element; and

3: range-Doppler cells that do not meet those criteria and that are not selected only based on local information.

Perform a global NCI (or CI) inside the master processing device (second radar-MMIC 410-2) by using category #2 information from slave processing devices (e.g., first radar-MMIC 410-1).

Run FFT-peak final selection on entire data cube using range-Doppler cells from category #2 received at the master.

Communicate results to each distributed processing element (the OR between the list of peaks form category #1 and the FFT-peak selection over the global NCI of category #2) as selected FFT-peaks.

Receive data from selected FFT peaks from other processing elements and then do DoA locally.

Then send FFT peak information to remote ECU for postprocessing.

Thus, only information of range-Doppler cells that need external confirmation may be sent to an external processing element for external verification combining NCI or CI with the range-Doppler cells of this processor and running then a FFT-peak detection algorithm on the entire range-Doppler map to confirm which ones have been selected.

In some implementations, the implementation of FIG. 7e can be further modified. For example, also another processor (e.g. radar-MMIC 410-3 or ECU) than second radar-MMIC 410-2 could perform the confirmation by performing a global NCI (or CI) using category #2 information (confirmable range-Doppler cells) from the radar-MMICs 410-1, 410-2. The computation of the angular information related to the final peak detections could be done in accordance with one of the implementations of FIGS. 7a-7d.

Thus, the present disclosure is related to an apparatus 400 for detecting radar targets. The apparatus 400 comprises a first radar-MMIC 410-1 configured to receive a plurality of first receive signals from first antennas (#1, #2, #3) of an antenna array 414, determine a first combined range-Doppler map by combining range-Doppler maps of each of the first antennas (#1, #2, #3), and to determine first confirmable range-Doppler cells of the first combined range-Doppler map matching a predetermined confirmation criterion.

The apparatus 400 further comprises a second radar-MMIC 410-2 configured to receive a plurality of second receive signals from second antennas (#4, #5, #6) of the antenna array 414, determine a second combined range-Doppler map by combining range-Doppler maps of each of the second antennas (#4, #5, #6), and to determine second confirmable range-Doppler cells of the second combined range-Doppler map matching the predetermined confirmation criterion.

The apparatus 400 further comprises processing circuitry 410-2, 410-3 configured to combine the first and second confirmable range-Doppler cells to obtain a combined set of confirmable range-Doppler cells, sum values of the first and the second combined range-Doppler map corresponding to the combined set of confirmable range-Doppler cells to obtain summed values of the combined confirmable range-Doppler cells, and to select summed values of the combined set of confirmable range-Doppler cells exceeding a predefined selection threshold as selected range-Doppler cells for further processing, such as target detection.

Figure 8A:
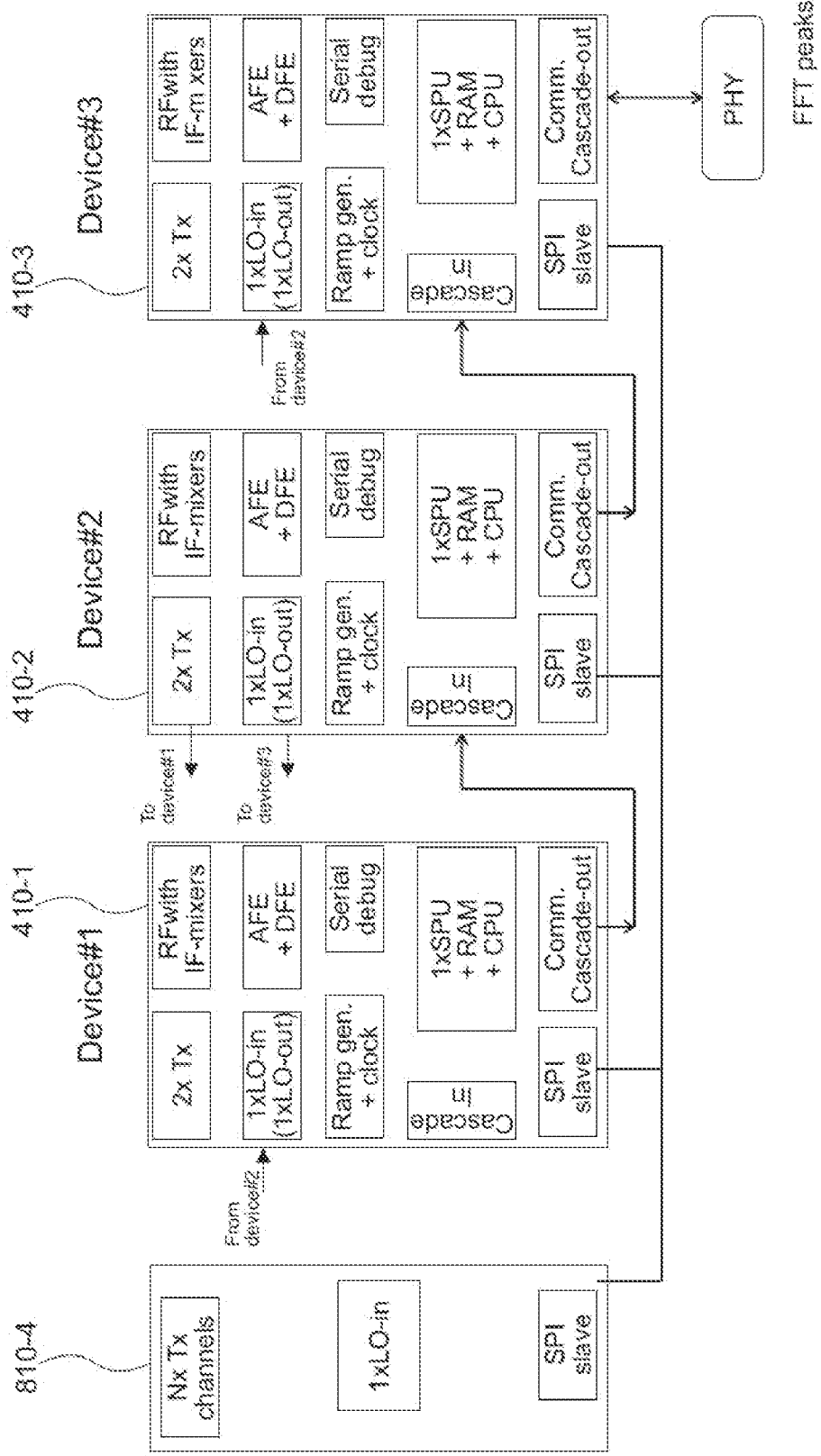
FIG. 8a shows a block diagram of distributed radar signal processing according to an example implementation of the present disclosure.
Figure 8B:
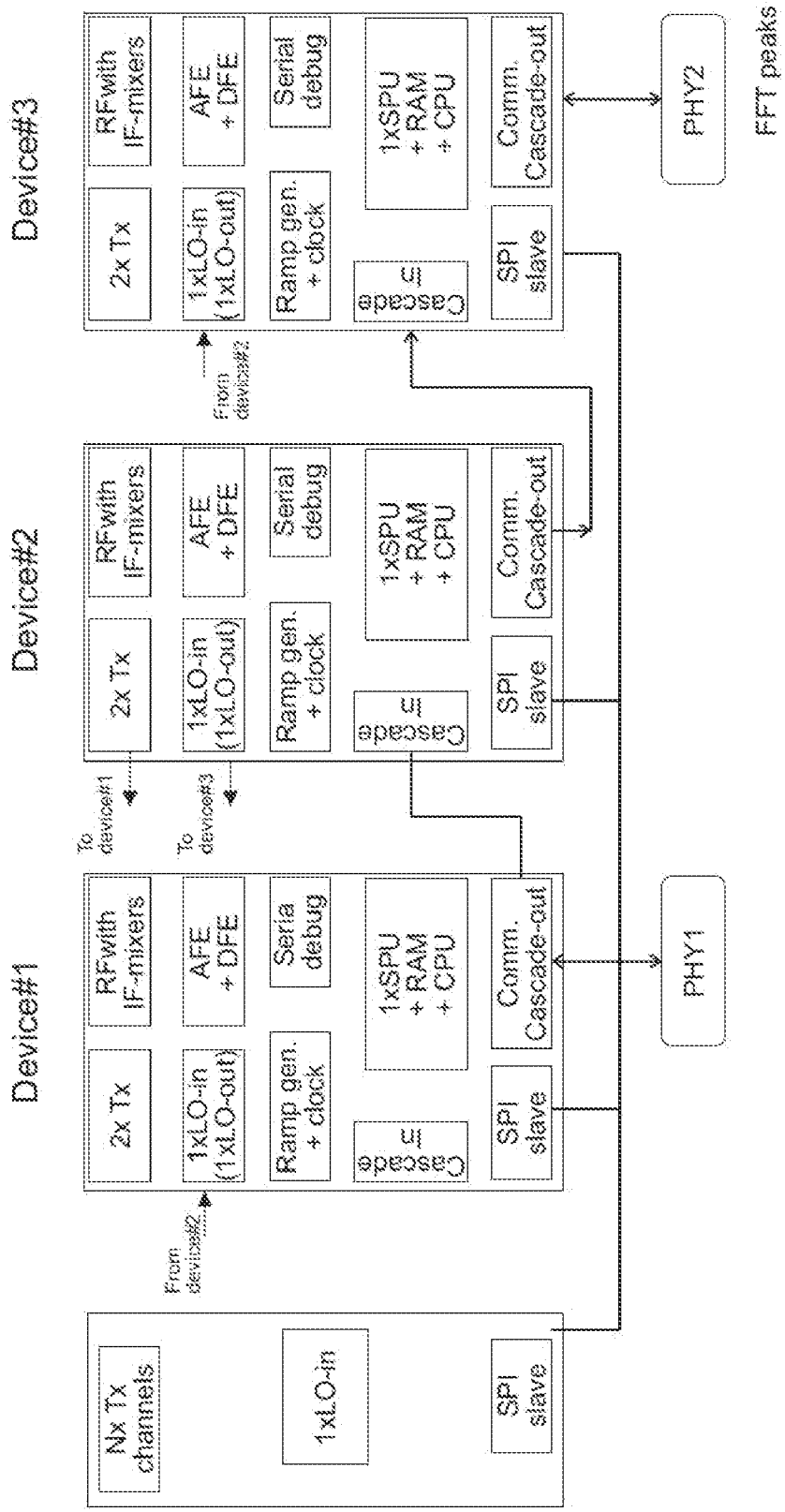
FIG. 8b shows a block diagram of distributed radar signal processing according to another example implementation of the present disclosure.

Two examples of cascaded radar-MMIC layouts in accordance with implementations of the present disclosure are shown in FIGS. 8a and 8b.

FIG. 8a shows an implementation with three radar-MMICs 410-1, 410-2, 410-3 acting as receiver ICs and another radar-MMIC 810-4 acting as transmitter IC. Each of the radar-MMICs 410-1, 410-2, 410-3 is connected to a subset of receive antennas of an receive antenna array (not shown). The radar-MMIC 810-4 is connected to transmit antennas of an transmit antenna array (not shown). The radar-MMIC 410-2 provides is local oscillator (LO) signal as synchronization signal to the other radar-MMICs 410-1, 410-3, and 810-4. All radar-MMICs 410-1, 410-2, 410-3, and 810-4 are connected via SPI. While radar-MMIC 410-3 acts as SPI master, the others act as SPI slaves. A communication cascade reaches from radar-MMIC 410-1 via radar-MMIC 410-2 to radar-MMIC 410-3.

In one example implementation, the second radar-MMIC 410-2 can combine the detected range-Doppler map subregions (for example, the binary map thereof) received from the first radar-MMIC 410-1 with its own detected range-Doppler map subregions via a logic OR to obtain combined subregions and forward this result to the third radar-MMIC 410-3 for further combination with its own detected range-Doppler map subregions to obtain the complete detected subregions. This information on the final detected subregions indicated by the final binary map may then be distributed to each of the MMICs 410-1, 410-2 with a request to extract and send related phase information to the third radar-MMIC 410-3. The third radar-MMIC 410-3 may then either calculate the final angular FFT or send the data to an external ECU.

In some implementations, in a first round the binary maps of detected range-Doppler map subregions are transmitted along with the phase information for each detected range-Doppler map subregion. The second radar-MMIC 410-2 can combine the binary map received from the first radar-MMIC 410-1 with its own binary map via a logic OR to obtain combined subregions and forward this result to the third radar-MMIC 410-3 for further combination with its own binary map to obtain the final detected subregions. In a second round, each MMICs may provide additional phase information for those final detected subregions that were not among its own detected range-Doppler map subregions in the first round.

In some implementations, as shown in FIG. 8a, the MMICs are cascaded in a way such that no dedicated processing master exist. Each processing element processes data independently to identify the respective candidate FFT peaks (detected range-Doppler map subregions) to be sent to the central ECU. Each MMIC shares the respective list of candidate FFT peaks in order to generate a combined list of candidate peaks. Each of them sends its own FFT peaks and a list of FFT peaks found by the other processing element(s) in the radar. There is no master device but there could be only one device used to manage the external communication (so, sending the information describing FFT peaks). The cascading concept is based on a data cascading link to a device managing the communication (communication master) and a link used to send commands from the communication master to the other devices. The link is shown as SPI but can be of any other form (e.g., circular ring, . . . ).

FIG. 8b shows an implementation in line with the flowchart of FIG. 7b. Here, the individual MMICs do not send the phase information of the detected range-Doppler map subregions to a communication master but to an external ECU. The ECU may then calculate the angular FFT based on the information describing the detected range-Doppler map subregions received from the MMICs As described herein, latency can be reduced as interim results do not have to be passed to a master device to select which peak to send. The concept works similar when using compressed communication of range-Doppler map subregions or FFT peaks.

The aspects and features mentioned and described together with one or more of the previously detailed examples and figures, may as well be combined with one or more of the other examples in order to replace a like feature of the other example or in order to additionally introduce the feature to the other example.

Implementations may further be or relate to a computer program having a program code for performing one or more of the above methods, when the computer program is executed on a computer or processor. Steps, operations or processes of various above-described methods may be performed by programmed computers or processors. Implementations may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all implementations and examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A radar device, comprising:
   a first radar-integrated circuit (IC) for processing first receive signals from first antennas of an antenna array, wherein the first radar-IC is configured to:
   determine a first combined range-Doppler map based on range-Doppler maps of each of the first antennas of the antenna array,
   determine first selected range-Doppler cells of the first combined range-Doppler map based on a predetermined selection criterion;
   determine first confirmable range-Doppler cells of the first combined range-Doppler map based on a predetermined confirmation criterion;
   a second radar-IC for processing second receive signals from second antennas of the antenna array, wherein the second radar-IC is configured to:
   determine a second combined range-Doppler map based on range-Doppler maps of each of the second antennas of the antenna array,
   determine second selected range-Doppler cells of the second combined range-Doppler map based on the predetermined selection criterion;
   determine second confirmable range-Doppler cells of the second combined range-Doppler map based on the predetermined confirmation criterion;
   wherein the first radar-IC is configured to:
   communicate information indicating the first confirmable range-Doppler cells to the second radar-IC;
   wherein the second radar-IC is configured to:
   determine a set of confirmable range-Doppler cells based on the first confirmable range-Doppler cells and the second confirmable range-Doppler cells,
   communicate the set of confirmable range-Doppler cells to the first radar-IC;

wherein the first radar-IC is configured to:
communicate values of the first combined range-Doppler map corresponding to the set of confirmable range-Doppler cells to the second radar-IC,
wherein the second radar-IC is configured to:
perform a summation of values of the first combined range-Doppler map and the second combined range-Doppler map corresponding to the set of confirmable range-Doppler cells to obtain summed values of the set of confirmable range-Doppler cells;
select one or more summed values, of the summed values of the set of confirmable range-Doppler cells, exceeding a predefined threshold as third selected range-Doppler cells, and
combine the third selected range-Doppler cells with the first selected range-Doppler cells and the second selected range-Doppler cells to obtain collectively selected range-Doppler cells; and
a data interface configured to forward information indicative of the collectively selected range-Doppler cells to a common processor for further processing.

2. The radar device of claim 1, wherein the first radar-IC is configured to communicate information indicating the first confirmable range-Doppler cells to the second radar-IC and information indicating the first selected range-Doppler cells to the second radar-IC.

3. The radar device of claim 1, wherein the first radar-IC is configured to communicate binary information indicating the first selected range-Doppler cells and the first confirmable range-Doppler cells to the second radar-IC.

4. The radar device of claim 1, wherein the second radar-IC is configured to combine the first selected range-Doppler cells and second selected range-Doppler cells via a logic OR to obtain combined selected range-Doppler cells and to combine the combined selected range-Doppler cells with the third selected range-Doppler cells via a logic OR to obtain the collectively selected range-Doppler cells.

5. The radar device of claim 1, wherein the predetermined selection criterion comprises a range-Doppler cell amplitude or an energy level above a first threshold, and wherein the predetermined confirmation criterion comprises the range-Doppler cell amplitude or the energy level below the first threshold and above a second threshold.

6. The radar device of claim 1, wherein the predetermined confirmation criterion comprises a range level above a first threshold, and wherein the predetermined selection criterion comprises a range level below the first threshold and above a second threshold.

7. The radar device of claim 1, wherein the first radar-IC is configured to combine the range-Doppler maps of each of the first antennas by coherent integration or non-coherent integration, and wherein the second radar-IC is configured to combine the range-Doppler maps of each of the second antennas by coherent integration or non-coherent integration.

8. The radar device of claim 1, wherein the second radar-IC is configured to perform the summation of values of the first combined range-Doppler map and the second combined range-Doppler map corresponding to the set of confirmable range-Doppler cells by coherent integration or non-coherent integration.

9. The radar device of claim 1, wherein the information indicative of the collectively selected range-Doppler cells forwarded to the common processor comprises phase information across at least one of the first antennas or the second antennas, and wherein the phase information is associated with the collectively selected range-Doppler cells.

10. The radar device of claim 9, wherein the common processor is configured to determine spatial directions of target objects based on the phase information associated with the collectively selected range-Doppler cells.

11. The radar device of claim 10, wherein the common processor is configured to forward the collectively selected range-Doppler cells and associated spatial directions to a central control unit.

12. The radar device of claim 1, wherein the second radar-IC is configured as the common processor.

13. The radar device of claim 12, wherein the second radar-IC is configured to forward the collectively selected range-Doppler cells and associated phase information across the first antennas and the second antennas to an external processor.

14. The radar device of claim 1, wherein signal processing of the first radar-IC and the second radar-IC is synchronized using a common synchronization signal.

15. A method for detecting radar targets, the method comprising:
receiving, with a first radar-integrated circuit (IC), a plurality of first receive signals from first antennas of an antenna array;
determining, in the first radar-IC, a first combined range-Doppler map based on range-Doppler maps of each of the first antennas of the antenna array;
determining, in the first radar-IC, first selected range-Doppler cells of the first combined range-Doppler map based on a predetermined selection criterion;
determining, in the first radar-IC, first confirmable range-Doppler cells of the first combined range-Doppler map based on a predetermined confirmation criterion;
receiving, with a second radar-IC, a plurality of second receive signals from second antennas of the antenna array;
determining, in the second radar-IC, a second combined range-Doppler map based on range-Doppler maps of each of the second antennas of the antenna array;
determining, in the second radar-IC, second selected range-Doppler cells of the second combined range-Doppler map based on the predetermined selection criterion;
determining, in the second radar-IC, second confirmable range-Doppler cells of the second combined range-Doppler map based on the predetermined confirmation criterion;
communicating information indicating the first confirmable range-Doppler cells from the first radar-IC to the second radar-IC;
determining, in the second radar-IC, a set of confirmable range-Doppler cells based on the first confirmable range-Doppler cells and the second confirmable range-Doppler cells;
communicating the set of confirmable range-Doppler cells to the first radar-IC;
communicating values of the first combined range-Doppler map corresponding to the set of confirmable range-Doppler cells from the first radar-IC to the second radar-IC;
performing, in the second radar-IC, a summation of the values of the first combined range-Doppler maps and values of the second combined range-Doppler maps corresponding to the set of confirmable range-Doppler cells to obtain summed values of the set of confirmable range-Doppler cells;

selecting one or more summed values, of the summed values of the set of confirmable range-Doppler cells, exceeding a predefined threshold as third selected range-Doppler cells;

combining the third selected range-Doppler cells with the first selected range-Doppler cells and the second selected range-Doppler cells to obtain collectively selected range-Doppler cells; and forwarding information indicative of the collectively selected range-Doppler cells to a common processor for further processing.

16. The method of claim 15, further comprising communicating information indicating the first selected range-Doppler cells to the second radar-IC.

17. The method of claim 15, further comprising determining spatial directions of target objects based on the collectively selected range-Doppler cells and based on phases of the plurality of first receive signals and the plurality of second receive signals associated with the collectively selected range-Doppler cells.

18. The method of claim 15, further comprising detecting target objects based on the collectively selected range-Doppler cells.

19. A method for detecting radar targets, the method comprising:

receiving, with a first radar-integrated circuit (IC), a plurality of first receive signals from first antennas of an antenna array;

determining, in the first radar-IC, a first combined range-Doppler map by combining range-Doppler maps of each of the first antennas;

determining, in the first radar-IC, first confirmable range-Doppler cells of the first combined range-Doppler map matching a predetermined confirmation criterion;

receiving, with a second radar-IC, a plurality of second receive signals from second antennas of the antenna array;

determining, in the second radar-IC, a second combined range-Doppler map by combining range-Doppler maps of each of the second antennas;

determining, in the second radar-IC, second confirmable range-Doppler cells of the second combined range-Doppler map matching the predetermined confirmation criterion;

combining the first confirmable range-Doppler cells and second confirmable range-Doppler cells to obtain a set of confirmable range-Doppler cells;

summing values of the first and the second combined range-Doppler map corresponding to the set of confirmable range-Doppler cells to obtain summed values of the set of confirmable range-Doppler cells; and selecting one or more summed values, of the summed values of the set of confirmable range-Doppler cells, exceeding a predefined selection threshold as selected range-Doppler cells.

20. The method of claim 9, further comprising detecting target objects based on the selected range-Doppler cells.

21. The method of claim 19, wherein the predefined selection threshold comprises a range-Doppler cell amplitude or an energy level, and wherein the predetermined confirmation criterion comprises the range-Doppler cell amplitude or the energy level below the predefined selection threshold and above a lower threshold.

22. The method of claim 19, wherein the predetermined confirmation criterion comprises a range level above a first threshold, and wherein the predefined selection threshold comprises a range level below the first threshold and above a second threshold.

23. The method of claim 19, further comprising determining spatial directions of target objects based on the selected range-Doppler cells and based on phases of the plurality of first receive signals and the plurality of second receive signals associated with the selected range-Doppler cells.

* * * * *